US008068977B2

(12) United States Patent
Ozawa et al.

(10) Patent No.: US 8,068,977 B2
(45) Date of Patent: Nov. 29, 2011

(54) DESTINATION PREDICTION APPARATUS AND METHOD THEREOF

(75) Inventors: Jun Ozawa, Nara (JP); Takashi Tajima, Osaka (JP); Mototaka Yoshioka, Osaka (JP); Takahiro Kudoh, Kyoto (JP)

(73) Assignee: Panasonic Corporation, Osaka (JP)

( * ) Notice: Subject to any disclaimer, the term of this patent is extended or adjusted under 35 U.S.C. 154(b) by 234 days.

(21) Appl. No.: 12/095,105

(22) PCT Filed: Sep. 19, 2007

(86) PCT No.: PCT/JP2007/068127

§ 371 (c)(1),
(2), (4) Date: May 27, 2008

(87) PCT Pub. No.: WO2008/041480

PCT Pub. Date: Apr. 10, 2008

(65) Prior Publication Data

US 2010/0036601 A1 Feb. 11, 2010

(30) Foreign Application Priority Data

Sep. 28, 2006 (JP) ................................. 2006-266061

(51) Int. Cl.
*G01C 21/00* (2006.01)

(52) U.S. Cl. ..................... 701/201; 701/118; 340/995.1; 340/995.13

(58) Field of Classification Search .................. 701/118, 701/201; 340/995.1, 995.13
See application file for complete search history.

(56) References Cited

U.S. PATENT DOCUMENTS

| | | | | |
|---|---|---|---|---|
| 2002/0143490 | A1 * | 10/2002 | Maeda et al. | 702/150 |
| 2005/0251325 | A1 | 11/2005 | Kudo et al. | |

FOREIGN PATENT DOCUMENTS

| | | |
|---|---|---|
| JP | 2001-147126 | 5/2001 |
| JP | 2002-303524 | 10/2002 |
| JP | 2004-309299 | 11/2004 |
| JP | 2005-37375 | 2/2005 |
| JP | 2005-156350 | 6/2005 |
| JP | 2006-53132 | 2/2006 |
| WO | 2004/034725 | 4/2004 |

OTHER PUBLICATIONS

International Search Report issued Dec. 25, 2007 in the International (PCT) Application of which the present application is the U.S. National Stage.

* cited by examiner

*Primary Examiner* — Hussein Elchanti
*Assistant Examiner* — Redhwan κ Mawari
(74) *Attorney, Agent, or Firm* — Wenderoth, Lind & Ponack, L.L.P.

(57) ABSTRACT

To provide a destination prediction apparatus which predicts a destination more accurately than before. A destination prediction apparatus which predicts a destination of a mobile object includes: a stay characteristic accumulating unit in which stay characteristic information indicating a time period when the mobile object will likely stay at a predetermined point is accumulated; a travel time calculating unit which calculates a travel time in the case where the mobile object heads from a current location obtained by a current point obtaining unit to the point; and a destination predicting unit which calculates an estimated arrival time based on a current time obtained by a current time obtaining unit and the calculated travel time and predicts the point as a destination only when a condition that the calculated estimated arrival time and a time period indicated by the stay characteristic information is satisfied.

9 Claims, 38 Drawing Sheets

FIG. 4

103

| Point ID | Registered name | Position information | | Stay start time | Stay end time |
|---|---|---|---|---|---|
| | | Latitude | Longitude | | |
| Home | Home | 34. 41 | 135. 52 | 18:00 | 7:00 |
| Landmark 1 | Office | 34. 23 | 134. 13 | 9:00 | 17:00 |
| Landmark 2 | Restaurant | 34. 35 | 134. 15 | 12:30 | 13:30 |
| ... | ... | ... | ... | ... | ... |

FIG. 6

| Point ID | Registered name | Required time | Predicted stay time (A) | Stay start time (B) | \|A − B\| |
|---|---|---|---|---|---|
| Home | Home | 1:30 | 17:30 | 18:00 | 0:30 |
| Landmark 1 | Office | 1:00 | 17:00 | 9:00 | 8:00 |
| Landmark 2 | Restaurant | 0:30 | 16:30 | 12:30 | 4:00 |
| ... | ... | ... | ... | ... | |

Predicted as destination (arrow pointing to the Home row)

FIG. 11

902

| Facility name | Category | Location | Service start time | Service end time |
|---|---|---|---|---|
| Restaurant A | Restaurant | Kyoto | 10:00 | 20:00 |
| Restaurant B | Restaurant | Kyoto | 11:00 | 22:00 |
| Restaurant C | Restaurant | Kyoto | 9:00 | 20:00 |
| Restaurant D | Restaurant | Osaka | 10:00 | 20:00 |
| Restaurant E | Restaurant | Osaka | 11:00 | 22:00 |
| Restaurant F | Restaurant | Osaka | 9:00 | 20:00 |
| Convenience store A | Convenience store | Kyoto | 7:00 | 24:00 |
| Convenience store B | Convenience store | Osaka | 6:00 | 24:00 |
| Convenience store C | Convenience store | Osaka | 6:00 | 23:00 |
| ... | ... | ... | ... | ... |

FIG. 13

Accumulated by commercial facility data unit 902

Calculate estimated arrival time based on current point and current time

| Facility name | Service start time | Service end time | Estimated arrival time | Prediction result |
|---|---|---|---|---|
| Restaurant A | 10:00 | 20:00 | 19:30 | |
| Restaurant B | 11:00 | 22:00 | 20:00 | Predicted as destination |
| Restaurant C | 9:00 | 20:00 | 19:30 | |

FIG. 21

1704

| Date | Day of week | Time | Latitude | Longitude | Stop/ Departure | |
|---|---|---|---|---|---|---|
| October 12th | Thursday | 20:18 | 34. 41 | 135. 52 | Stop | Home |
| October 13th | Friday | 8:23 | ditto | ditto | Departure | |
| October 13th | Friday | 9:35 | 34. 33 | 135. 45 | Stop | Office |
| October 13th | Friday | 19:12 | ditto | ditto | Departure | |
| October 13th | Friday | 19:35 | 34. 38 | 135. 47 | Stop | Book store |
| October 13th | Friday | 20:15 | ditto | ditto | Departure | |
| October 13th | Friday | 20:42 | 34. 41 | 135. 52 | Stop | Home |
| ... | ... | ... | ... | ... | ... | |

FIG. 23
(A) Home
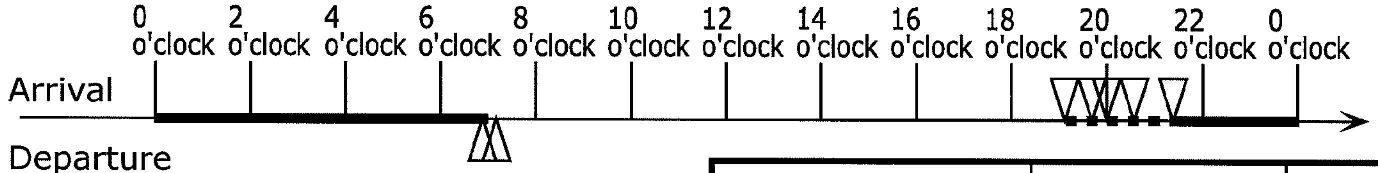
| | Stop | Departure |
|---|---|---|
| Stay characteristic at home | 19:10~21:45 | 7:10~7:30 |
(B) Office
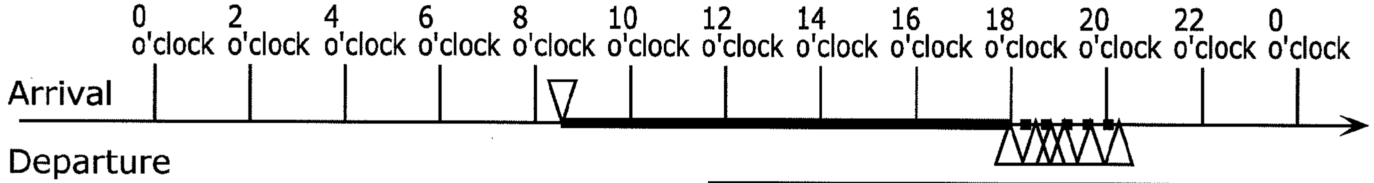
| | Stop | Departure |
|---|---|---|
| Stay characteristic at office | 8:40~8:50 | 17:25~21:44 |
(C) Book store
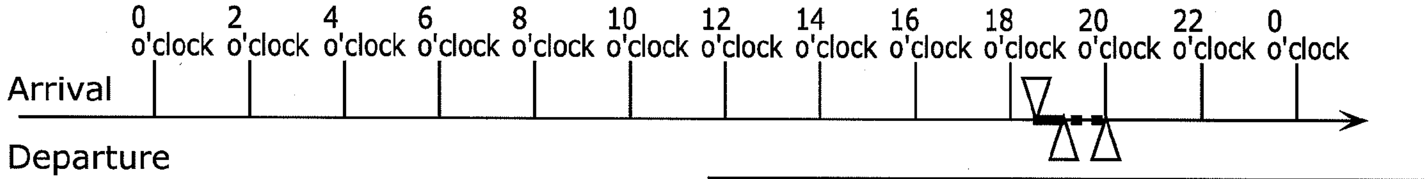
| | Stop | Departure |
|---|---|---|
| Stay characteristic at book store | 18:25~18:40 | 18:45~20:32 |

FIG. 24

| | Stop | Departure | Estimated arrival time when departing from departure point at 21:20 | Potential destination |
|---|---|---|---|---|
| Stay characteristic at home | 19:10~21:45 | 7:10~7:30 | 22:10 | ○ |
| Stay characteristic at office | 8:40~8:50 | 17:25~21:44 | 22:15 | × |
| Stay characteristic at book store | 18:25~18:40 | 18:45~20:32 | 22:05 | × |

Accumulated by stay characteristic accumulating unit 1706 (Stop, Departure)

Result of calculating estimated arrival time (Estimated arrival time)

Result of predicting destination (Potential destination)

(A)

| | Stop | Departure |
|---|---|---|
| Stay characteristic at company | 9:00 | 18:00 |

(B)

| | Stop | Departure |
|---|---|---|
| Stay characteristic at home | 20:00 | 7:00 |

(A) Stop history at home (B) Stay characteristic at home

| Departure | Stop |
|---|---|
| 8:00~18:30 | 15:00~21:00 |

(C) Stay characteristic at home for each time period

| Date | Frequency (number of times) | Relative time till next stop | Arrival time period | Estimated return home time when departing from given location |
|---|---|---|---|---|
| 8:00~10:00 | 35 | 10:30 | 18:30~20:30 | ——— |
| 10:00~12:00 | 2 | 9:00 | 19:00~21:00 | ——— |
| 12:00~14:00 | 12 | 3:00 | 15:00~17:00 | ——— |
| 14:00~16:00 | 10 | 2:00 | 16:00~18:00 | 17:15 |
| 16:00~18:00 | 3 | 1:00 | 17:00~19:00 | ——— |
| 18:00~20:00 | 1 | 0:30 | 18:30~20:30 | ——— |
| ··· | ··· | ··· | ··· | ——— |

Accumulated by stay characteristic accumulating unit 1706

| Destination candidate | Estimated arrival time using traffic congestion information | Prediction result | Arrival prediction using driving history of user | Prediction result |
|---|---|---|---|---|
| Office | 18:00 | | 16:00 | Destination |
| Home | 16:30 | Destination | 16:00 | |
| Restaurant | 16:00 | | 16:00 | |

FIG. 34

Accumulated by driving time accumulating unit 2904

Taking more time than usual due to traffic congestion

| Departure point | Arrival point | Required time by experience | Number of experiences | Variation in required time | Current required time |
|---|---|---|---|---|---|
| C00101 | C00104 | 20 minutes | 5 times | 5 minutes | 25 minutes |
| C00103 | C00104 | 20 minutes | 7 times | 3 minutes | 70 minutes |
| C00106 | C00103 | 15 minutes | 4 times | 5 minutes | 60 minutes |
| C00109 | C00106 | 35 minutes | 3 times | 15 minutes | 45 minutes |
| C00106 | C00105 | 40 minutes | 2 times | 10 minutes | 35 minutes |
| C00105 | C00102 | 40 minutes | 3 times | 10 minutes | 40 minutes |
| ... | ... | ... | ... | ... | ... |

FIG. 35

| Stay point | Route and required time | | | | |
|---|---|---|---|---|---|
| Home | Business trip destination→C00109 | C00109→C00106 | C00106→C00105 | C00105→Home | |
| | 20 minutes | 15 minutes | 15 minutes | 10 minutes | |
| Restaurant | Business trip destination→C00109 | C00109→C00110 | C00110→ Restaurant | | |
| | 20 minutes | 25 minutes | 15 minutes | | |
| Office | Business trip destination→C00109 | C00109→C00106 | C00106→C00103 | C00103→C00104 | C00104→Office |
| | 20 minutes | 15 minutes | 10 minutes | 10 minutes | 15 minutes |

FIG. 38

| Destination candidate | Stay start time | Stay end time | Estimated arrival time using traffic congestion information | Prediction result |
|---|---|---|---|---|
| Office | 9:00 | 17:00 | 18:00 | |
| Home | 19:00 | 7:00 | 16:30 | Destination |
| Restaurant | 12:30 | 13:30 | 16:00 | |

DESTINATION PREDICTION APPARATUS AND METHOD THEREOF

TECHNICAL FIELD

The present invention relates to an apparatus in a mobile object represented by an in-vehicle device, a mobile phone, and the like which predicts a destination of a user using the mobile object.

BACKGROUND ART

Thanks to modules such as a Global Positioning System (GPS), it has gradually become easy to obtain position information of a user. In particular, installation of the GPS in a car navigation system or a mobile phone has made it possible to realize a system for navigating to a destination or providing information according to the position information.

On the other hand, advent of a small device having huge memory storage represented by a Hard Disk Drive (HDD) has gradually made it possible to take out video and audio contents even to the outside. Further, a map containing large commercial information can be installed in a car navigation device, and it has additionally become possible to not only navigate a driver but also provide various kinds of commercial information.

However, when the user attempts to obtain information, the user itself is required to input a search condition for search. On the other hand, a technique for filtering information to be provided to the user based on the position information obtained with the GPS and providing information on a point where the user is currently present has been also developed. However, even if the information is obtained after arriving at the point, it may be late. For example, if information on a traffic accident can be obtained in advance, it is possible to head for a destination using a detour.

Predicting a future destination of the user allows information to be provided in advance. To do so, a technique for accumulating past travel histories and predicting a destination headed in the past as a destination at a current time has been disclosed in Patent Reference 1.

Patent Reference 1: Japanese Unexamined Patent Application Laid-Open Publication No. 2005-156350.

SUMMARY OF INVENTION

Problems that Invention is to Solve

However, an apparatus according to Patent Reference 1 searches the past travel histories with a current date and time condition and predicts, as a present destination, a place most frequently reached in past driving. For instance, it is assumed that a history of returning home from a company between 17:00 and 18:00 is accumulated. If a current time is 17:30, the present destination is determined to be a home based on the past destination. However, in the case where a current point is far away from the home and it is not possible to arrive there by 18:00 even when going home at the current time of 17:30, the destination is inappropriately determined as the “home”.

The present invention has been devised in view of the above situation, and has an object of providing a destination prediction apparatus which predicts a destination more accurately than the conventional apparatus.

Means to Solve the Problems

In order to achieve the above-mentioned object, a destination prediction apparatus according to the present invention is a destination prediction apparatus which predicts a destination of a mobile object and includes a stay characteristic accumulating unit in which stay characteristic information indicating a time period when the mobile object will likely stay at a predetermined point is accumulated and a destination predicting unit which calculates an estimated arrival time in the case where the mobile object departs from a current location to the point and predicts the point as a destination only when a condition that the calculated estimated arrival time and the time period indicated by the stay characteristic information are temporally close is satisfied.

Moreover, the present invention can be realized as not only the destination prediction apparatus but also a destination prediction method and a computer program.

Effect of Invention

As the destination prediction apparatus according to the present invention does not predict, as a destination, a point that cannot be reached in a time period when the mobile object will likely stay at the point, it is possible to predict a destination more accurately than before.

In addition, as the destination prediction apparatus according to the present invention predicts a destination using stay characteristic information that is different from conventionally used travel history information, it becomes possible to predict a destination even at a point never visited before where travel history information is not available. Thus, its practical value is quite high.

BRIEF DESCRIPTION OF DRAWINGS

FIG. 4 is a diagram showing stay characteristic information according to the first embodiment.

FIG. 6 is a diagram describing prediction of a destination according to the first embodiment.

FIG. 11 is a diagram showing commercial facility data according to the first modification of the first embodiment.

FIG. 13 is a diagram describing prediction of a destination according to the first modification of the first embodiment.

FIG. 21 is a diagram showing stay history information according to the second embodiment.

FIGS. 23A, B, and C is a diagram showing examples of stay conditions according to the second condition.

FIG. 24 is a diagram showing stay characteristic information according to the second embodiment.

FIG. 34 is a diagram showing driving time information according to the third embodiment.

FIG. 35 is a diagram describing a calculation of required time according to the third embodiment.

FIG. 38 is a diagram showing a prediction result according to the third embodiment.

NUMERICAL REFERENCES

Figure 1:
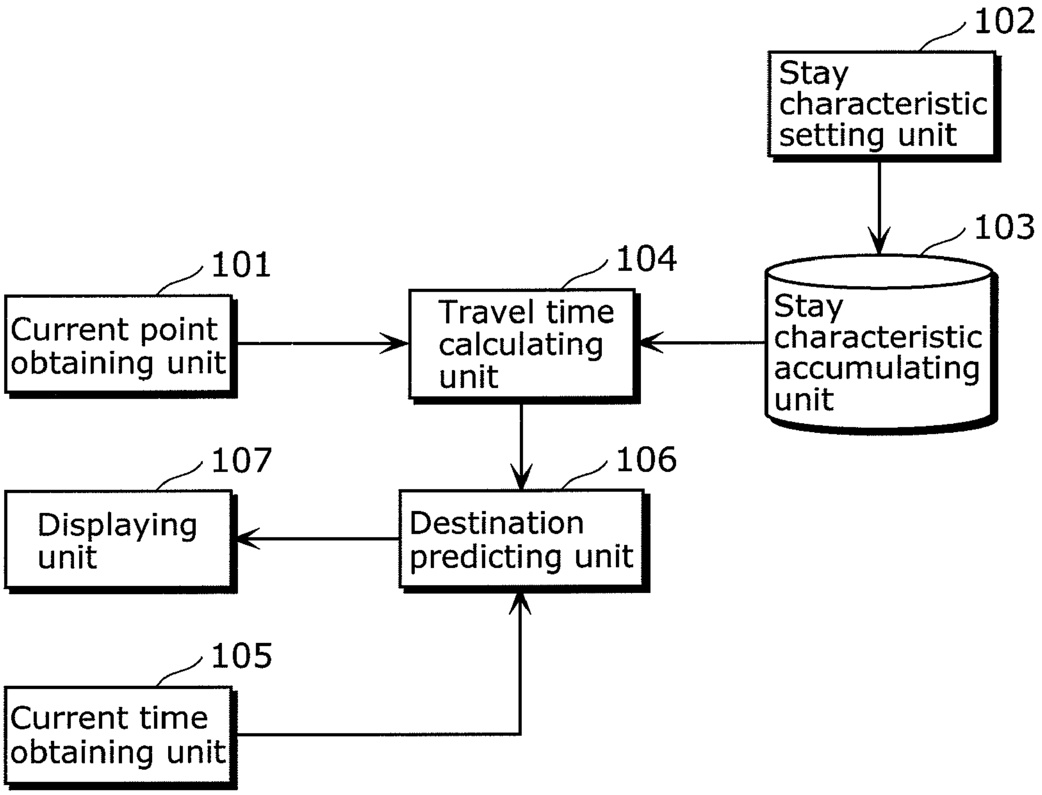
FIG. 1 is a diagram showing a system structure according to a first embodiment.

101 Current point obtaining unit
102 Stay characteristic setting unit
103 Stay characteristic accumulating unit
104 Travel time calculating unit
105 Current time obtaining unit
106 Destination predicting unit
107 Displaying unit
901 Search condition input unit
902 Commercial facility data accumulating unit
903 Commercial facility data displaying unit
1401 Travel history accumulating unit
1402 Number of departures counting unit
1701 Stop position information detecting unit
1702 Stop time information detecting unit
1703 Departure time information detecting unit
1704 Stay history accumulating unit
1705 Stay characteristic extracting unit
1706 Stay characteristic accumulating unit
1707 Time and position detecting unit
1708 Arrival time calculating unit
1709 Destination predicting unit

1710 Displaying unit
2901 Current point obtaining unit
2902 Current time obtaining unit
2903 Travel history accumulating unit
2904 Driving time accumulating unit
2905 Travel time calculating unit
2906 Stay characteristic accumulating unit
2907 Destination predicting unit
2908 Displaying unit
3601 Central Processing Unit
3602 Working memory
3603 LCD device
3604 Touch panel
3605 Hard disk device
3607 Program
3608 Stay characteristic information
3609 GPS receiving device
3610 Bus line
3701 Prediction switch judging unit
3702 Route-based destination predicting unit

DETAILED DESCRIPTION OF THE INVENTION

According to one aspect of the present invention, a destination prediction which predicts a destination of a mobile object includes: a travel history accumulating unit in which travel history information regarding a past travel of the mobile object is accumulated; a stay characteristic extracting unit which extracts, from the travel history information, information indicating a previous time period when the mobile object has stayed at a predetermined point; a stay characteristic accumulating unit which accumulates the extracted information as stay characteristic information indicating a time period when the mobile object will likely stay at a predetermined point; and a destination predicting unit which calculates an estimated arrival time in the case where the mobile object departs from a current location to the point and predicts the point as a destination only when a condition that the calculated estimated arrival time and the time period indicated by the stay characteristic information are temporally close is satisfied.

Here, the stay characteristic information may indicate a stay start time which is a time when the mobile object will likely start staying at the point. The destination predicting unit may predict the point as the destination only when a difference between the calculated estimated arrival time and the stay start time indicated by the stay characteristic information is equal to or smaller than a predetermined threshold.

In addition, the stay characteristic information may indicate a stay start time which is a time when the mobile object will likely start staying at the point and a stay end time which is a time when the mobile object will likely end staying at the point. The destination predicting unit may predict the point as the destination only when the calculated estimated arrival time falls between the stay start time and the stay end time both indicated by the stay characteristic information.

Moreover, the destination predicting unit may further predict the point as the destination, even when the estimated arrival time does not fall between the stay start time and the stay end time, in the case where a difference between the estimated arrival time and the stay start time is equal to or smaller than a predetermined threshold.

With these structures, as there is no chance of predicting, as a destination, a point which cannot be reached in a time period when the mobile object will likely stay at the point, it is possible to predict a destination more accurately than before. In addition, as the prediction is performed using stay characteristic information that is different from conventionally-used travel history information, it is possible to predict a destination even at a never visited point where travel history information is not available.

Moreover, a business start time and a business end time at a facility located at the point may be accumulated, as the stay start time and the stay end time, in the stay characteristic accumulating unit.

Furthermore, the destination predicting unit may predict the point as the destination only when a difference between the estimated arrival time and the stay end time is equal to or greater than a predetermined threshold.

Additionally, information regarding a facility category for the facility may be accumulated in the stay characteristic accumulating unit, and the destination predicting unit may predict the point as the destination only when a difference between the estimated arrival time and the stay end time is equal to or greater than a predetermined threshold defined depending on the facility category.

Further, a facility information displaying unit may search business hours of one or more facilities accumulated in the stay characteristic accumulating unit and display information regarding the searched business hours of the one or more facilities, and the destination predicting unit may predict the destination from the one or more facilities having the information displayed by the facility information displaying unit.

With these structures, a preferable prediction-when it is determined whether or not a point where a facility exists becomes a destination, the facility which is reached, for example, just before closing time is not predicted as the destination in consideration of the business hours of the facility—can be performed.

Moreover, in the case where travel history information regarding the current location is accumulated, the destination prediction apparatus may predict a destination using the travel history information.

With this structure, a highly adaptable destination prediction—at a point where travel history information is available, the conventional destination prediction is performed using the travel history information, and at other points, a destination prediction according to the present invention is performed using stay characteristic information—can be performed.

Furthermore, the stay characteristic extracting unit may extract, from the travel history information, pieces of information each of which indicating, for different one of a plurality of points, a previous time period when the mobile object has stayed at the point; the stay characteristic accumulating unit may accumulate the extracted pieces of information as stay characteristic information for the different one of the plurality of points, and the destination predicting unit may, in the case where there is a plurality of points where the estimated arrival time falls between the stay start time and the stay end time both indicated by the stay characteristic information, preferentially predict, as the destination, a point where a difference between the calculated estimated arrival time and a stay end time is greater among the plurality of points.

With this structure, it is possible to predict, among points to be destination candidates, a more accurate point as a destination.

In addition, the stay characteristic extracting unit may extract, from the travel history information, pieces of information each of which indicating, for different one of a plurality of time slots, a previous time period when the mobile object has ended staying at the point in a time slot; the stay characteristic accumulating unit may accumulate the extracted pieces of information as stay characteristic information for the different one of the plurality of time slots; and the destination predicting unit may predict the point as the destination in the case where the calculated estimated arrival time falls between a stay start time and a stay end time both indicated by the stay characteristic information regarding a time slot including a time in the case where the mobile object has recently departed from the point.

With this structure, for example, in a situation where several people use the mobile object, even when a valid stay time period cannot be identified for a prediction because a stay start time and a stay end time extracted from the travel history information are dispersed over a wide time range, a possibility of predicting a destination appropriately can be enhanced by identifying a valid stay time period for each time slot by classifying a stay time period by a stay end time.

Moreover, according to another aspect of the present invention, a destination prediction which predicts a destination of a mobile object includes: a stay characteristic accumulating unit in which stay characteristic information indicating a time period when the mobile object will likely stay at a predetermined point is accumulated; a travel history accumulating unit in which travel history information regarding a past travel of the mobile object is accumulated; a driving time extracting unit which extracts, from the travel history information, information indicating driving times between intersections on routes from a current location of the mobile object to the point; and a destination predicting unit which calculates an estimated arrival time by adding, to a current time, the driving times indicated by the extracted information in the case where the mobile object departs from the current location to the point, and predicts the point as a destination only when a condition that the calculated estimated arrival time and the time period indicated by the stay characteristic information are temporally close is satisfied.

Furthermore, the destination predicting unit may present the calculated estimated arrival time to a driver and predict the destination.

With these structures, as an estimated arrival time which reflects the driver's past experience through the travel history information is used when predicting a destination, it is expected that a prediction result matches the driver's judged action better.

In addition, as the destination prediction apparatus presents, in the case where a traffic situation such as traffic congestion that is different from the experience is learned, the driver an estimated arrival time which is calculated in consideration of the traffic situation, it is possible to predict a destination adaptively after sharing the estimated arrival time that is different from the experience.

First Embodiment

A destination prediction apparatus according to the present invention is a destination prediction apparatus which predicts a destination of a mobile object and an apparatus which predicts whether or not a point becomes the destination of the mobile object based on stay characteristic information indicating a time period when the mobile object will likely stay at a predetermined point and an estimated arrival time in the case where the mobile object departs from a current point to the point.

FIG. 1 is a block diagram showing an example of a functional structure of the destination prediction apparatus. The destination prediction apparatus shown in FIG. 1 includes a current point obtaining unit 101, a stay characteristic setting unit 102, a stay characteristic accumulating unit 103, a travel time calculating unit 104, a current time obtaining unit 105, a destination predicting unit 106, and a displaying unit 107.

Here, the stay characteristic accumulating unit 103 is an example of a stay characteristic accumulating unit, and the current point obtaining unit 101, the travel time calculating unit 104, the current time obtaining unit 105, and the destination predicting unit 106 in the aggregate are an example of a destination predicting unit.

Figure 2:
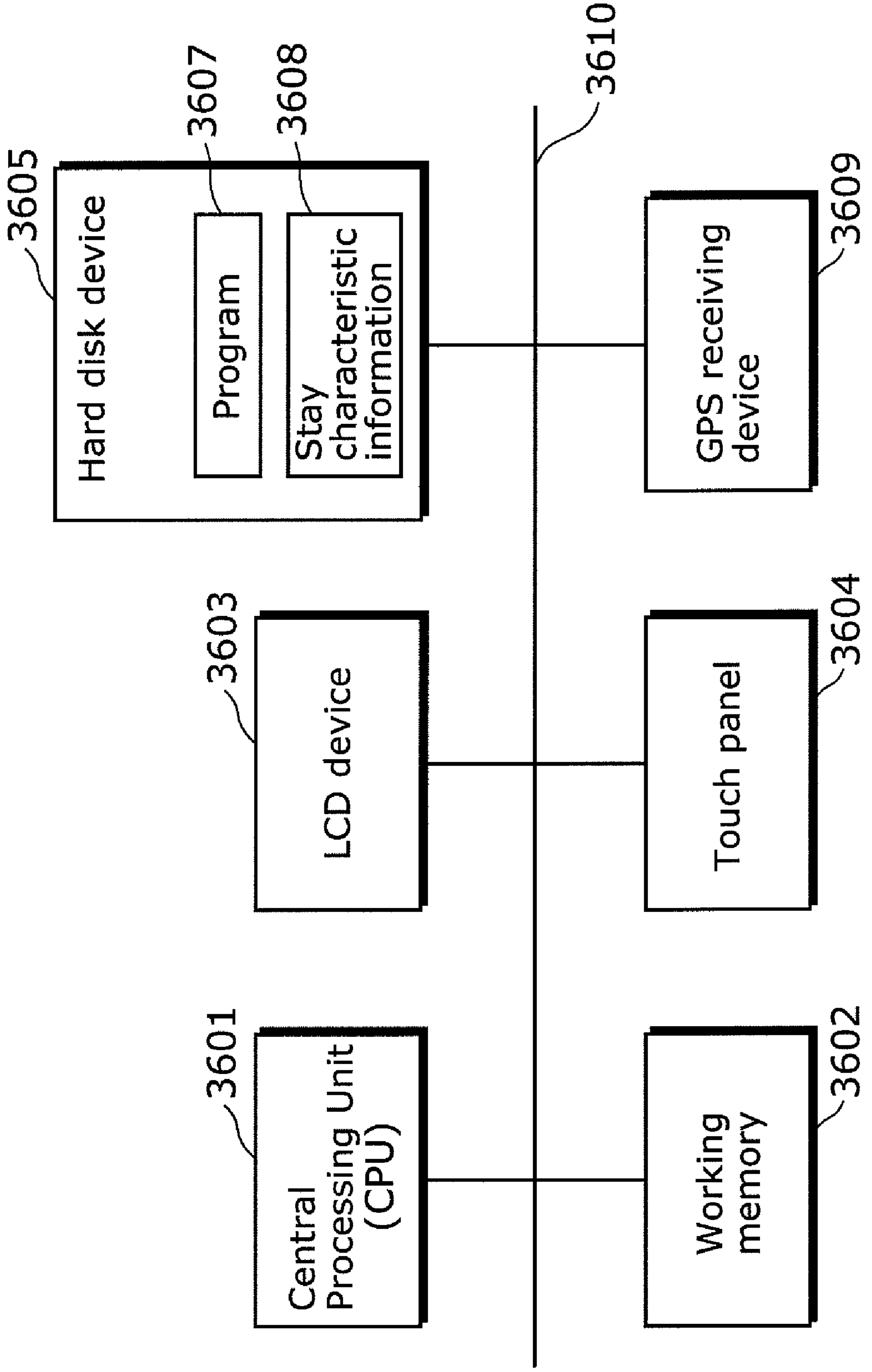
FIG. 2 is a diagram showing a hardware structure for realizing a destination prediction apparatus according to the first embodiment.

FIG. 2 is a block diagram showing, as an example, a hardware structure for realizing the destination prediction apparatus. The destination prediction apparatus is, for example, realized by hardware which includes a Central Processing Unit 3601, a working memory 3602, an LCD device 3603, a touch panel 3604, a hard disk device 3605, a GPS receiving device 3609, and a bus line 3610 that connects these devices. Note that the hardware is an example, and the present invention includes a case where an alternative having an equivalent function is used.

A program 3607 that can be executed by a computer and stay characteristic information 3608 are stored in the hard disk device 3605. A function of the destination prediction apparatus is performed by execution of the program performed by the Central Processing Unit 3601 using the working memory 3602.

An operation of each module shown in FIG. 1 will be described with reference to a relation with the hardware shown in FIG. 2.

The current point obtaining unit 101 and the current time obtaining unit 105 obtain a vehicle's current position and a current time by receiving a GPS signal using, for example, the GPS receiving device 3609.

The stay characteristic setting unit 102 obtains stay characteristic information via the touch panel 3604 from a user who is a driver and the like. The stay characteristic information may indicate a stay start time when the user will likely start staying or, along with the stay start time, a stay end time when the user will likely end staying.

In the case where a car navigation system is installed in a vehicle, a driver may register, as landmarks, places frequently visited, such as "Home" and "Office". Pieces of stay characteristic information on the registered landmarks are obtained respectively.

Figure 3:
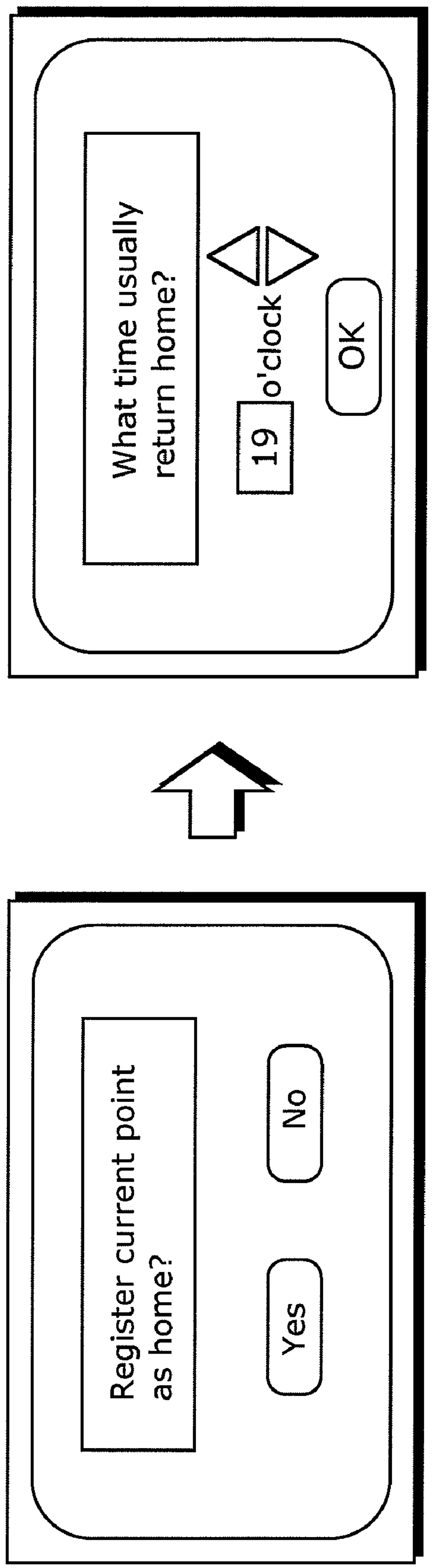
FIG. 3 is a diagram showing a screenshot according to the first embodiment.

FIG. 3 shows an example of an interface for obtaining stay characteristic information. As shown in FIG. 3, when the vehicle is brought to a stop in a parking space, a menu shown in FIG. 3 is displayed on the LCD device 3603. A return home time is obtained as a stay start time at the home via the touch panel 3604. Note that, in the case where a landmark is not the home, an arrival time at the landmark is obtained as a stay start time. Moreover, although not illustrated, similar to the return home time and the arrival time, a departure time from the landmark may be obtained as a stay end time.

The stay characteristic accumulating unit 103 accumulates the stay characteristic information obtained from the user by the stay characteristic setting unit 102. For example, as shown in FIG. 4, regarding "Home", "Landmark 1", and the like, their registered names, positions by latitude and longitude, and additionally information on stay start times and stay end times are accumulated. The registered stay start times and stay end times here correspond respectively to the return home time, or the arrival time, and the departure time set on the interface shown in FIG. 3 by the user as mentioned above.

The travel time calculating unit 104 calculates a travel time from a current point to each point using information of the current point obtained by the current point obtaining unit 101 and position information of each point accumulated by the stay characteristic accumulating unit 103. For instance, linear distance between the current point and each point is calculated, and it becomes possible to calculate the travel time to each point using an average speed of the vehicle (e.g. 10 km/hour). Furthermore, routes to a point pre-registered by the stay characteristic accumulating unit are searched using map information, and a required travel time may be calculated based on costs of each of the routes.

Figure 5:
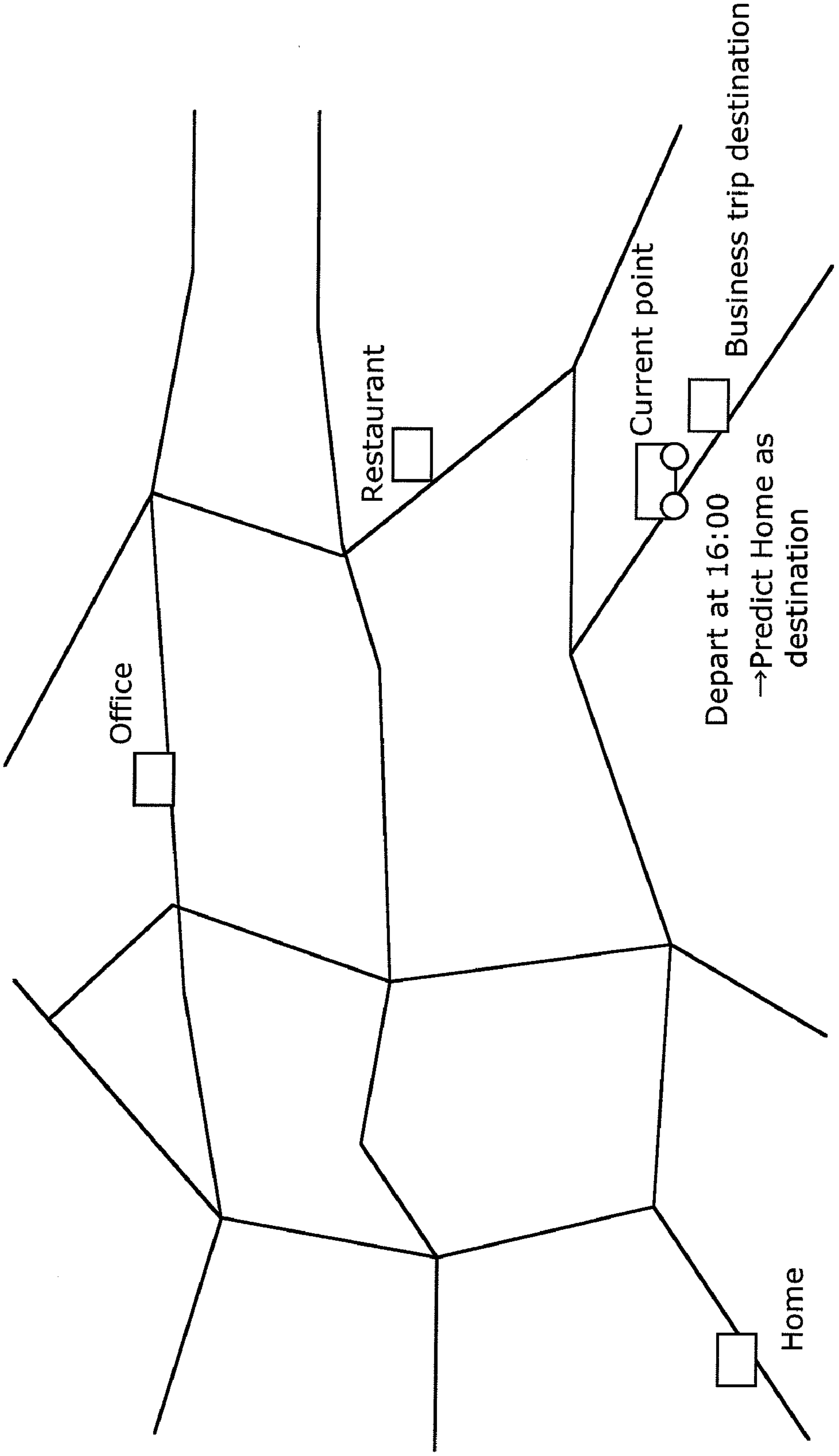
FIG. 5 is a diagram showing a map according to the first embodiment.

For example, as shown in FIG. 5, in the case of departing from a business trip destination at 16:00, "Home", "Office", and "Restaurant" are assumed as three destination candidates. A difference between an estimated arrival time and a stay start time is calculated for all points registered by the stay characteristic accumulating unit 103, and all of the points having the difference equal to or smaller than a predetermined threshold may be extracted as candidates. As a result of calculating a travel time to each destination, a required time for arriving at each point is calculated as shown in FIG. 6. For instance, a required time for travelling from a current point to "Home" is 90 minutes. Moreover, a required time to Office is 60 minutes, and a required time to Restaurant is 30 minutes.

The destination predicting unit 106 calculates an estimated arrival time at each destination when travelling to each destination based on the travel time calculated for each point by the travel time calculating unit 104 and the current time obtained by the current time obtaining unit 105, and predicts, as a destination to be headed from a current departure point, a point where a condition that the calculated estimated arrival time and a stay period accumulated by the stay characteristic accumulating unit 103 are temporally close is satisfied.

Here, the expression that the condition that the estimated arrival time and the stay period are temporally close is satisfied denotes that the difference between the estimated arrival time and the stay start time is smaller than a predetermined threshold. Note that the same expression may be used to denote that the estimated arrival time falls between the stay start time and the stay end time.

For example, as shown in FIG. 6, in the case of departing from the current point, the estimated arrival time has been calculated for the registered destinations. Further, a destination to be headed is predicted by comparing a stay characteristic at each point. Specifically, the difference between the estimated arrival time and the stay start time is calculated for each point, and a point having the minimum difference is predicted as the destination by using the minimum difference among the differences calculated as the above-mentioned threshold.

In the example shown in FIG. 6, a current time is 16:00, and in the case of departing from the current point to Home, an estimated arrival time at Home is 17:30. On the other hand, since a stay start time at Home (regular return home time) is 18:00, a 30-minutes difference from the estimated arrival time is calculated. Moreover, although an estimated arrival time is 17:00 for Office, a stay at Office starts at 9:00, which is a time for coming to Office, according to a stay characteristic accumulated by the stay characteristic accumulating unit 103. Consequently, a difference between the estimated arrival time and the stay start time is calculated as 8:00. Likewise, it is calculated as 4:00 for Restaurant. Subsequently, a point having the minimum difference between the estimated arrival time and the stay start time is predicted as a destination. In the case of FIG. 6, "Home" is predicted as the destination. Based on the above result, in the case of FIG. 6, the destination to be headed from the current point is "Home".

Figure 7:
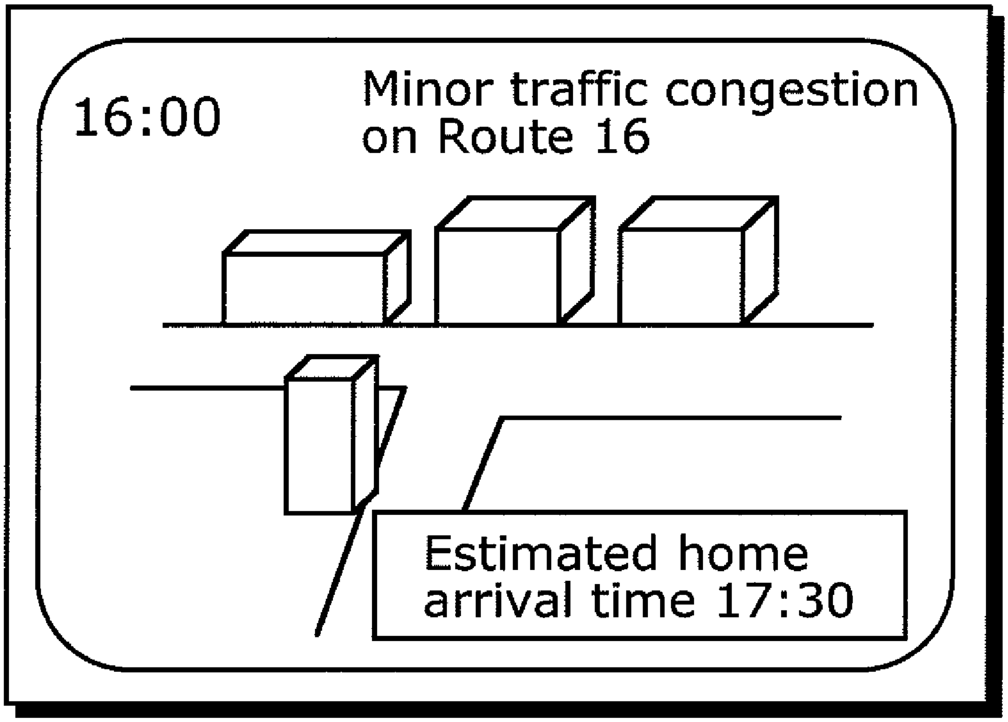
FIG. 7 is a diagram showing a screenshot according to the first embodiment.

When this kind of destination prediction apparatus is installed in a car navigation device and the destination of the user is predicted, for example, as shown in FIG. 7, it becomes possible to present an estimated arrival time at a home and traffic congestion, if any, in a route on the way to the home without making a route setting in advance by the user. In addition, only when there is usually no traffic congestion but there is traffic congestion just this once, information may be provided to a driver. Note that the information provided after predicting the destination may be not only traffic information but also commercial information.

Figure 8:
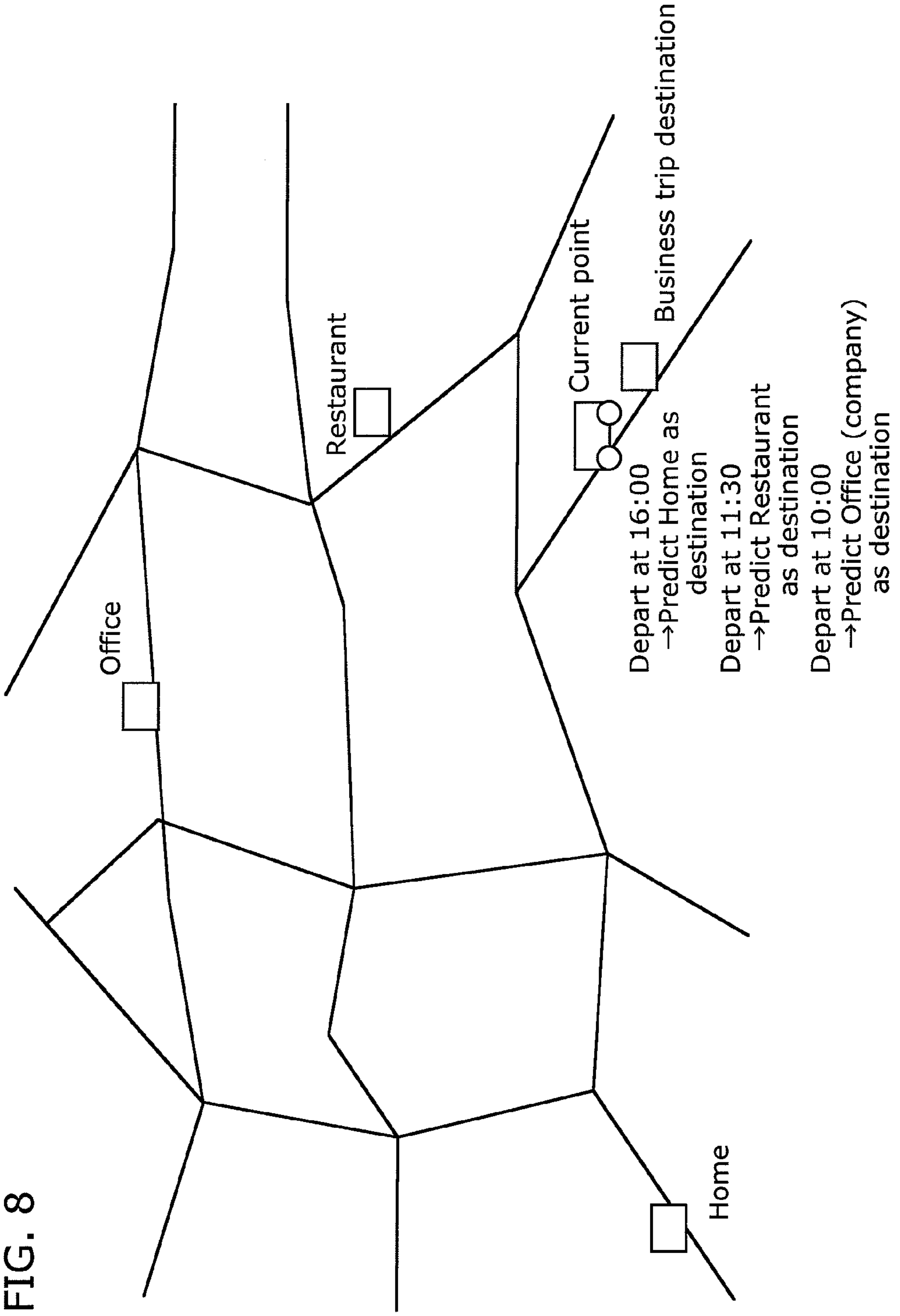
FIG. 8 is a diagram showing a map according to the first embodiment.

A case example of departing from the business trip destination at 16:00 has been described in the first embodiment. When a departure time differs even from the same departure point, a result of destination prediction differs. Such example is shown in FIG. 8. In FIG. 8, for example, in the case of departing from a current point at 11:30, an estimated arrival time at each point is calculated, and it becomes possible to predict that a destination is “Restaurant” for lunch based on a value obtained by the calculation and a stay start time at each stay point. Moreover, in the case of departing from the same departure point at 10:00, it is predicted that a destination is a company where Office is.

Figure 9:
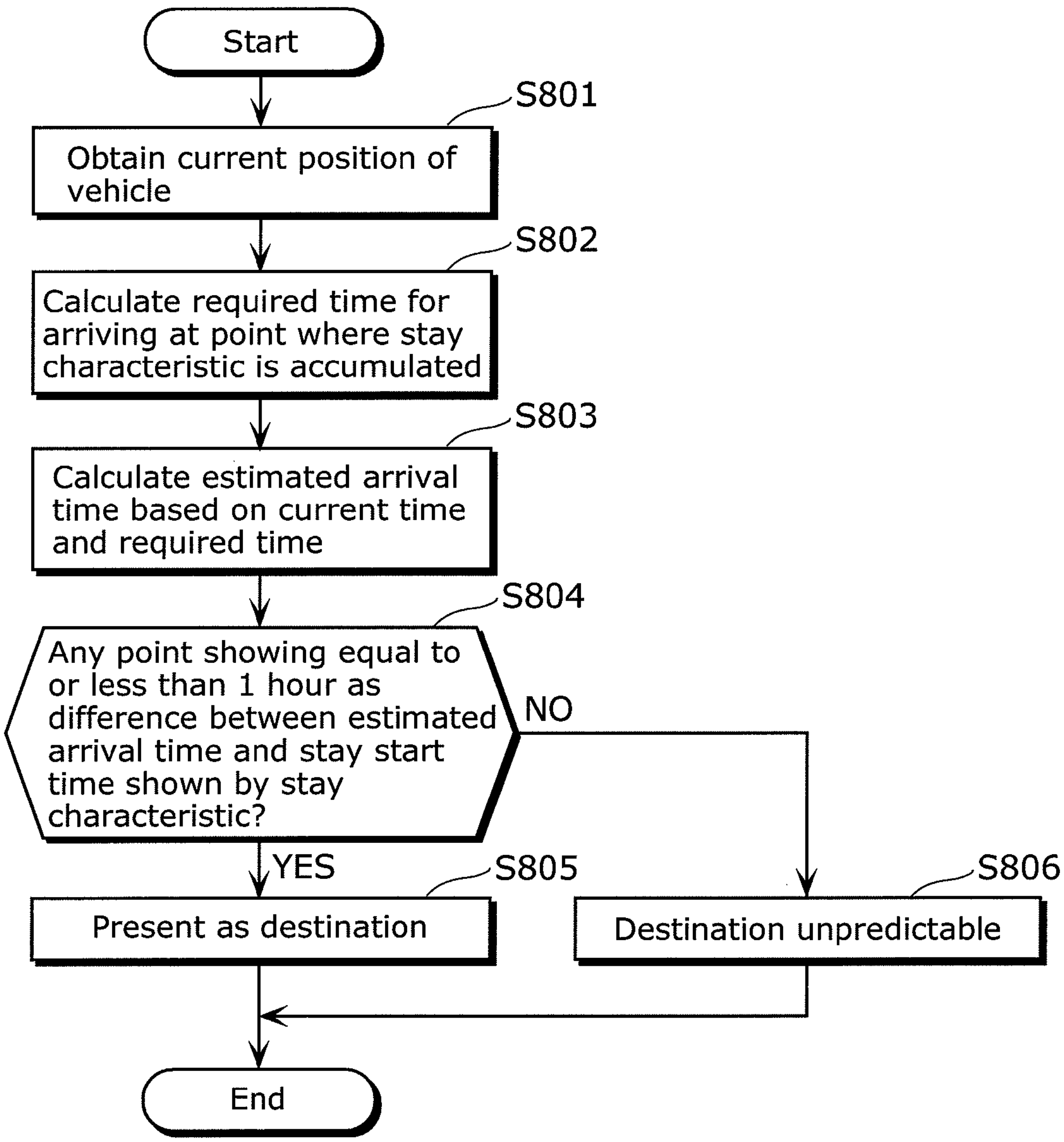
FIG. 9 is a flow chart according to the first embodiment.

The above operations will be described with reference to the flow chart shown in FIG. 9. First, the current point obtaining unit 101 obtains a vehicle’s current position (S801). Next, a required travel time from the current position obtained in step S801 is calculated for each point accumulated by the stay characteristic accumulating unit 103 (S802). An arrival time in the case of departing from the current point to each point is calculated using a current time obtained by the current time obtaining unit 105 and the required time calculated in step S802 (S803). A difference between a stay start time at each point accumulated by the stay characteristic accumulating unit 103 and the arrival time calculated in S802 is calculated, and if there is a point having the difference that is equal to or less than 1 hour, the point is predicted as a destination and the process proceeds to S805 (S804). In the case where there is no place having the difference that is equal to or less than 2 hours, it is judged that there is no destination among the points registered by the stay characteristic accumulating unit 103 and the process proceeds to S806. In the case where there is a point predicted as the destination among the points registered by the stay characteristic accumulating unit 103, an estimated arrival time at the destination is presented or there are traffic congestion information and construction work information on a route to a predicted place of arrival, if any, they are provided to the user (S805). In the case where the destination cannot be predicted in S804, new information is not presented to the driver (S806).

As a result of the above operations, if stay characteristics of the driver are accumulated, even in the case where there is no accumulated past travel history of the vehicle in which a place never visited before is registered as a departure point and even when the place is departed from, it is possible to predict a destination.

Note that, although only one destination is predicted using a value of the difference between the estimated arrival time and the stay start time in the present embodiment, destination candidates may be identified and information relevant to each destination may be provided.

In addition, a destination may be predicted using information on the stay end time. For instance, it is assumed that Landmark A’s stay start time is 14:00 and stay end time is 16:00, that Landmark B’s stay start time is 14:00 and stay end time is 15:00, and that an estimated arrival time at respective Landmarks is 14:50. In this case, although a difference with the stay start time is 50 minutes for both Landmarks A and B, the estimated stay time at respective Landmarks are 1 hour 10 minutes and 10 minutes in consideration of the stay end time. Thus, since the estimated stay time is quite short in the case of heading for Landmark B, it may be acceptable that Landmark A having the large difference between the estimated arrival time and the stay end time is predicted as the destination.

Note that, although the destination prediction for vehicle has been described in the present embodiment, it can be applicable to a mobile phone and the like which allow position information to be obtained. Note that, in the case of the mobile phone, when calculating a travel time, it is necessary to calculate the travel time to each point in consideration of a possibility for using public transportation.

First Modification of First Embodiment

The first embodiment has described the example where a regular arrival time at a pre-registered point is obtained from a user as stay characteristic information to be used. On the other hand, as to a point where a facility is located, since business hours of the facility are limited, a user hardly visits the point other than the business hours. For example, a business start time and a business end time of a restaurant, department store, library, government office, and the like are often pre-determined. In the case where the user already knows the time, the user does not visit the point where these facilities are located neither before the start of business nor after the end of business.

The present embodiment will describe an apparatus which predicts a destination by presenting stay characteristic at a point where a facility is located using a business start time and a business end time of the facility and by searching a route using the point where the stay characteristic is accumulated and a current point. For brevity, hereinafter, due to an example of commercial facilities, a business start time is referred to as a service start time or an opening time, and a business end time is referred to as a service end time or a closing time.

In particular, it is rare for the user to memorize all of the opening times and closing times of commercial facilities. On the other hand, when the user operates a vehicle after information regarding business hours of a commercial facility is presented along with the commercial facility presented by a system, the user tends to head for a point with knowledge of the business hours. An apparatus that predicts which facility, among commercial facilities presented as a search result, the user heads for will be described.

Figure 10:
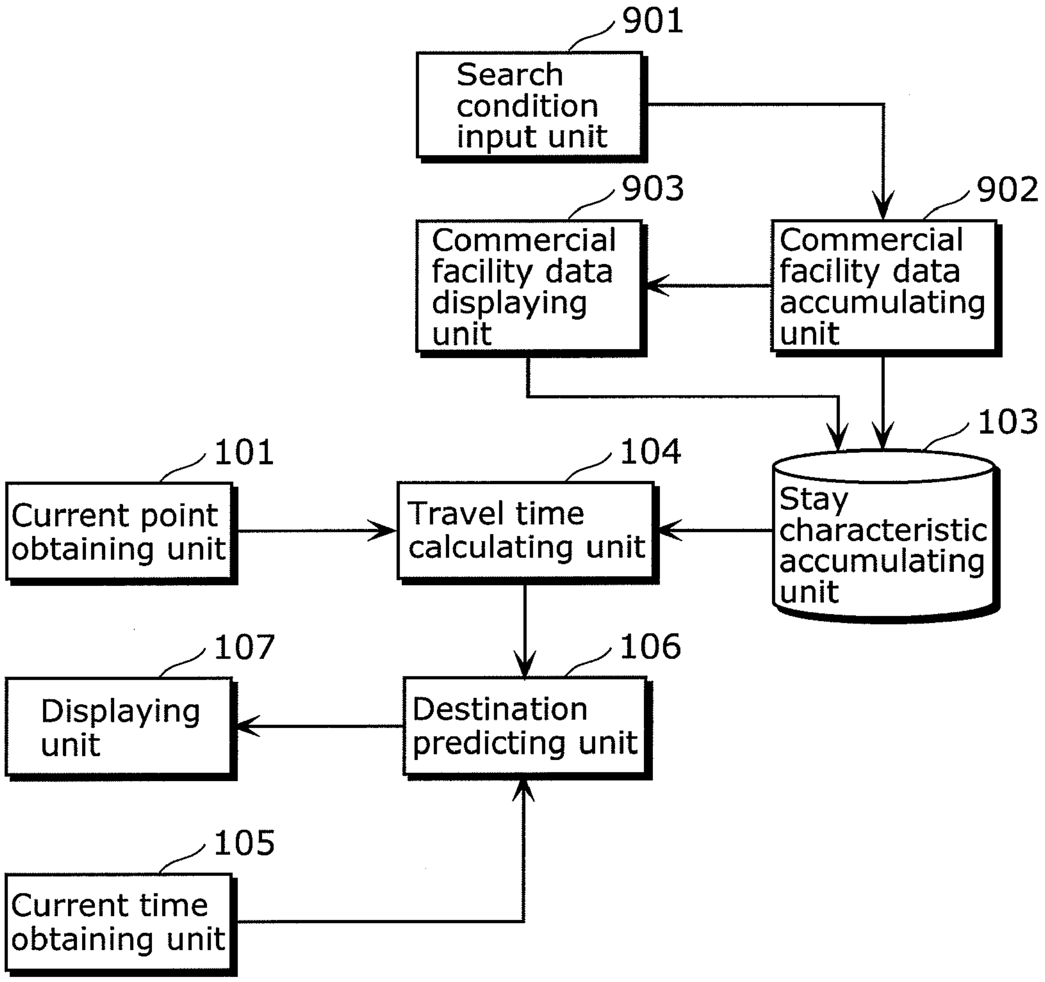
FIG. 10 is a diagram showing a system structure according to a first modification of the first embodiment.

FIG. 10 shows a system structure of the present embodiment. A destination prediction apparatus shown in FIG. 10 includes the current point obtaining unit 101, a search condition input unit 901, a commercial facility data accumulating unit 902, the stay characteristic accumulating unit 103, the travel time calculating unit 104, the current time obtaining unit 105, the destination predicting unit 106, and the displaying unit 107. Here, the commercial facility data displaying unit 903 is an example of a facility information displaying unit.

An operation of each module will be described. Note that any module which performs the same process as in the first embodiment will be given the same numeral and not be described.

The search condition input unit 901 obtains, for data regarding commercial facilities that is pre-accumulated or obtainable via a network, a search condition which is specified in an example menu style via the touch panel shown in FIG. 2. The user may specify a search condition by a category of facility or an area.

Data for providing information for the search condition (search condition by a category or a location, and the like) inputted by the search condition input unit 901 is accumulated in the commercial facility data accumulating unit 902.

For example, as shown in FIG. 11, information regarding a category of facility, a location, a service start time, and a service end time for each facility is accumulated in the commercial facility data accumulating unit 902.

Figure 12:
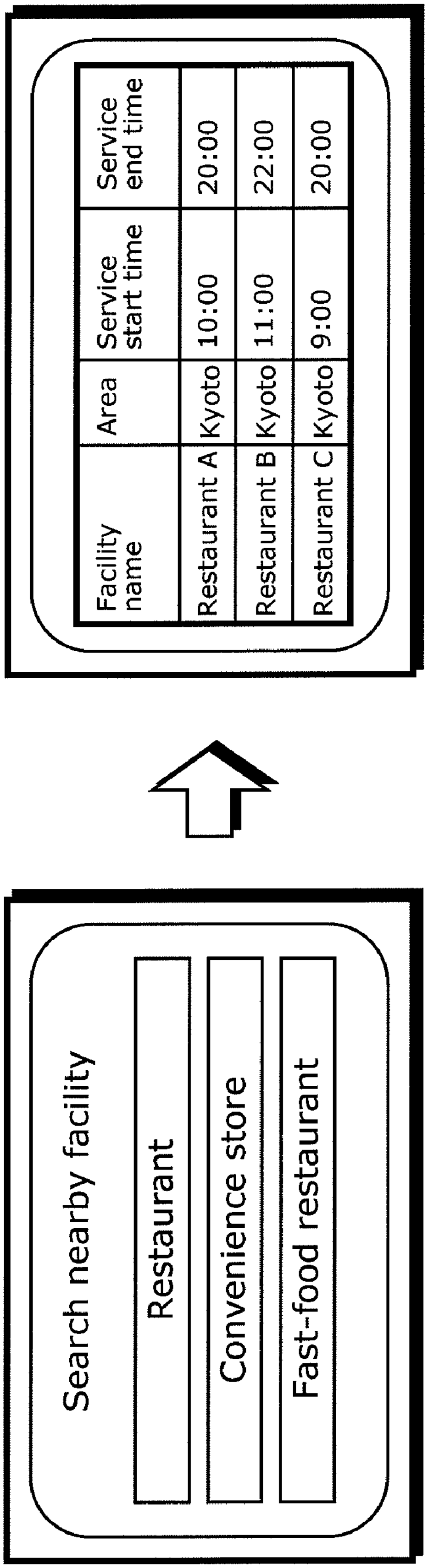
FIG. 12 is a diagram showing a screenshot according to the first modification of the first embodiment.

The commercial facility data displaying unit 903 displays, for the search condition inputted by the search condition input unit 901, the data accumulated in the commercial facility data accumulating unit 902 on the LCD device 3603 so that the data is presented to the user. For instance, data shown at the right side of FIG. 12 is presented as a search result. At this time, as the search result, information regarding business hours of each restaurant is also presented. Moreover, non-business hours may be presented.

Further, concerning the data displayed by the commercial facility data displaying unit 903, information regarding a point and business hours is accumulated as a stay characteristic by the stay characteristic accumulating unit 103. For example, as shown in FIG. 13, concerning Restaurant A, a service start time is 10:00 and a service end time is 20:00. Similarly, Restaurants B and C each presented as commercial facility data are accumulated in the same manner.

The travel time calculating unit 104 calculates a required time for travelling from a current point obtained by the current point obtaining unit 101 to Restaurants A, B, and C respectively. Further, the destination predicting unit 106 calculates an arrival time at each Restaurant using a current time obtained by the current time obtaining unit 105. Consequently, as shown in FIG. 13, estimated arrival times are calculated. Here, as the current time is 19:00, the arrival times at Restaurants A, B, and C are 19:30, 20:00, and 19:30 respectively.

Subsequently, a difference with the end time of service at each Restaurant is calculated, and a point having the difference higher than a predetermined value is predicted as a destination. In the first embodiment, the destination is predicted using the difference between the estimated arrival time and the stay start time. Here, the destination is predicted based on whether the estimated arrival time falls between the service start time and the service end time or the difference between the estimated arrival time and the service end time.

In the case of visiting a restaurant and the like, unless arriving there, for example, 1 hour before in order to eat a meal, there is a chance of not enjoying the meal adequately. Thus, the user is highly likely to select a destination where there is enough time until an end time of service. Accordingly, a destination which can be arrived at between a service start time and an end time and where there is more than a predetermined time (e.g. more than 1 hour) until a service end time is predicted.

Figure 14:
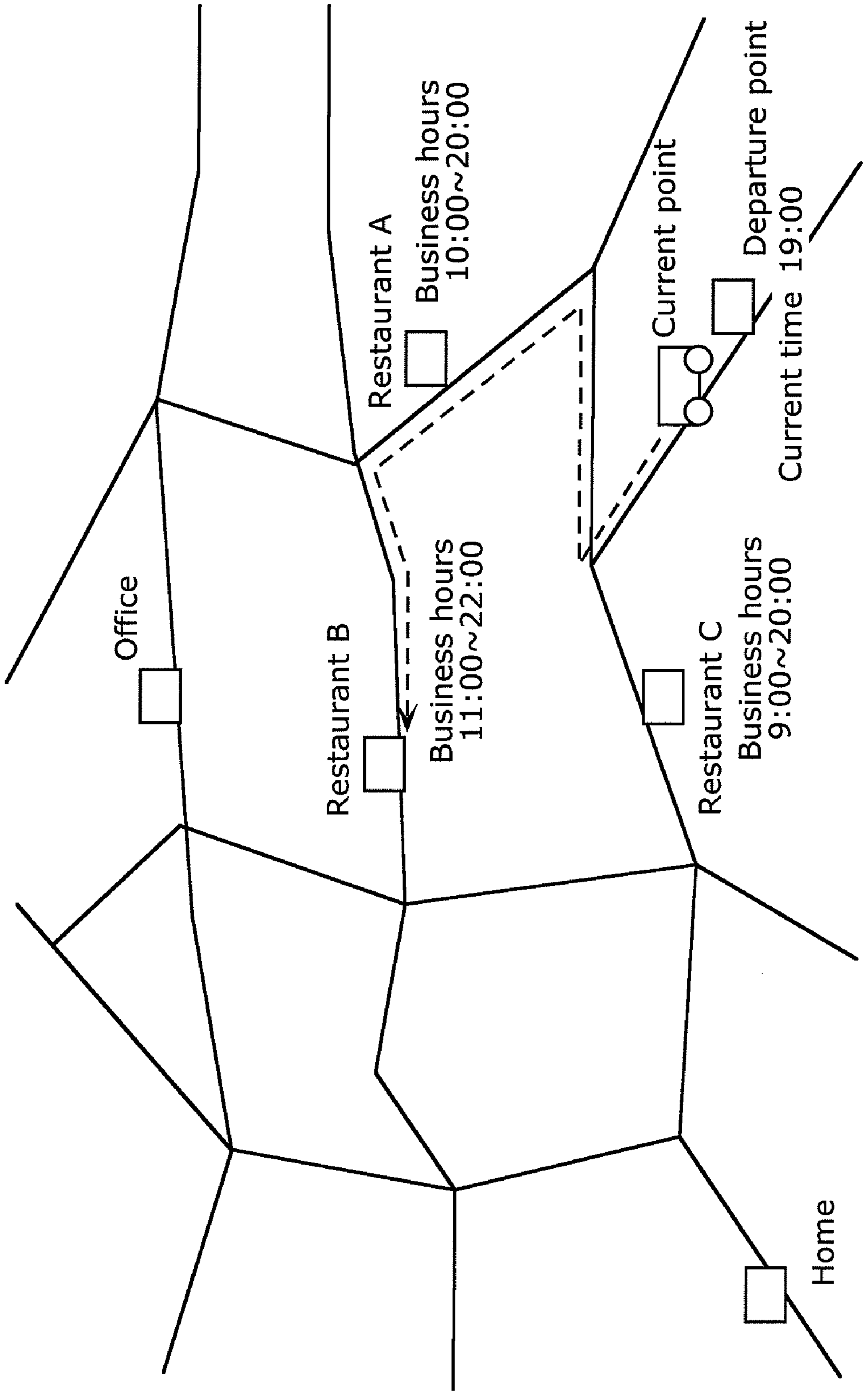
FIG. 14 is a diagram showing a map according to the first modification of the first embodiment.

As a result, since there is more than 1 hour between the estimated arrival time and the end time of service at Restaurant B, it is predicted as a next destination. In the case of the present embodiment, as shown in FIG. 14, when a point is departed from at 19:00, a destination is predicted. In FIG. 14, although Restaurants A and C are closer from the current point than Restaurant B, since the end time of service at each of the Restaurants is 20:00, there is not enough time to enjoy a meal even if heading for the former Restaurants from the current time of 19:00. Consequently, it is predicted that a driver would head for Restaurant B.

As the search result is the restaurant in the present embodiment, the point which can be reached 1 hour prior to the end time of service is predicted as the destination. By contrast, in the case where a selected search result category is a convenience store, it does not take much time for the user to reach an objective at a point. In this case, as long as there is a convenience store which can be reached within business hours, it can be predicted that any convenience store would be headed for. As stated above, when predicting a destination, it is necessary to change a difference between an estimated arrival time and an end time of service depending on a destination category.

In the present embodiment, the destination is predicted using the service start time and the service end time. Further, the destination may be predicted using information regarding business dates of a commercial facility such as business days and holidays. In other words, it is possible to predict that, among commercial facilities shown as a result of search, any commercial facility not having a business day would not be visited.

In the present embodiment, if the arrival time is within the business hours of the commercial facility such as the restaurant, a point is set as a destination candidate. Furthermore, in the case of arriving before the business hours, it is also possible not to set the point as the destination candidate. For instance, if departing from a home at 9:00 to a restaurant opening at 10:00, there is a case of arriving at 9:30. In this case, it is also possible not to set the commercial facility as a destination candidate.

Second Modification of First Embodiment

Figure 15:
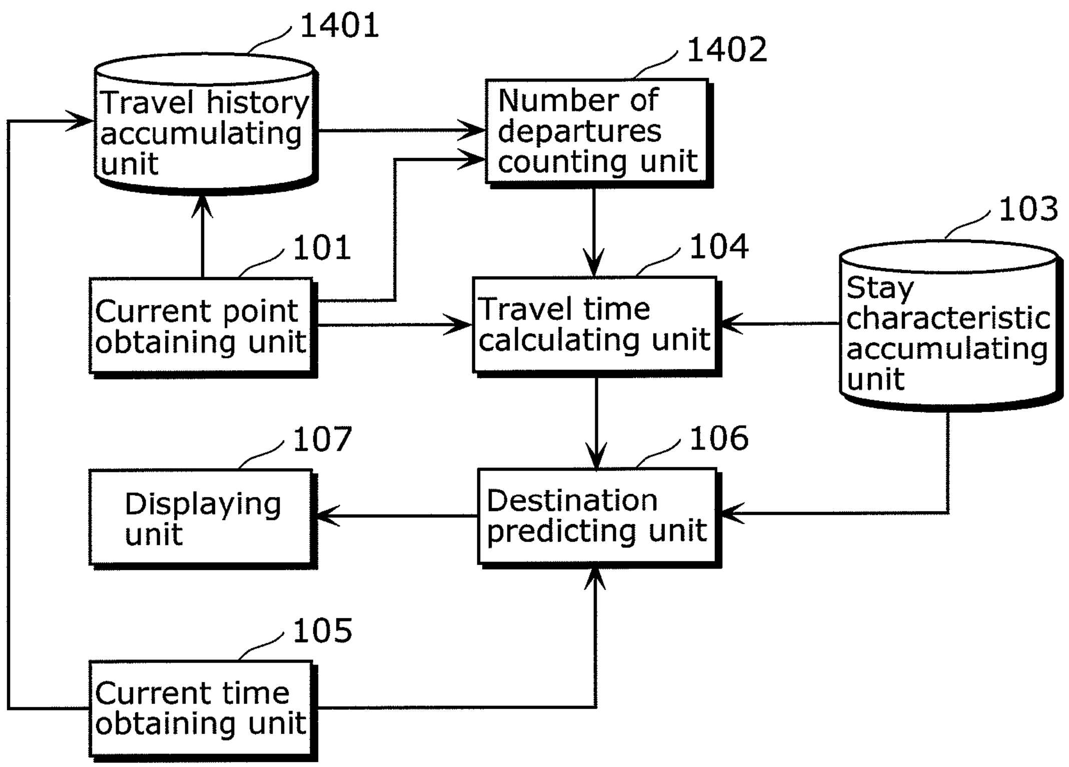
FIG. 15 is a diagram showing a system structure according to a second modification of the first embodiment.

The destination prediction apparatus according to the first embodiment predicts the destination using the stay characteristics set by the user. However, if travel histories of vehicle are sufficiently accumulated, it is possible to predict a destination using the travel histories. In the present embodiment, an apparatus which predicts a destination using stay characteristics when the travel histories of vehicle are not sufficiently accumulated and which predicts a destination using a travel history after the travel histories are sufficiently accumulated will be described. FIG. 15 shows a system structure of the present embodiment.

A destination prediction apparatus shown in FIG. 15 includes the current point obtaining unit 101, the stay characteristic setting unit 102, the stay characteristic accumulating unit 103, the travel time calculating unit 104, the current time obtaining unit 105, the destination predicting unit 106, a travel history accumulating unit 1401, a number of departures counting unit 1402, and the displaying unit 107. An operation of each module will be described. Note that any module which performs the same process as in the first embodiment will be given the same numeral and not be described. Here, the travel history accumulating unit 1401 is an example of a travel history accumulating unit.

The travel history accumulating unit 1401 periodically pairs a position of vehicle with a time based on a current point obtained by the current point obtaining unit 101 and a current time obtained by the current time obtaining unit 105, and accumulates it as a travel history.

The number of departures counting unit 1402 counts the number of departures from a point based on the travel history accumulated by the travel history accumulating unit 1401, when the vehicle departs. A predetermined point where the vehicle stays is accumulated as travel history information by visiting the point.

When the travel history information is referenced and there is no travel history of departing from the point, it is judged that the point is visited for the first time. In this case, in order to predict a destination, it is obviously impossible to use a travel history in which the point is a departure point.

In the case where it is judged that it is the first time to depart from the point, the destination is predicted using information regarding a stay characteristic inputted by the user in the past or information regarding a stay characteristic extracted from a past travel history. Concerning a destination prediction method, a destination is predicted by performing the same process as in the first embodiment.

Figure 16:
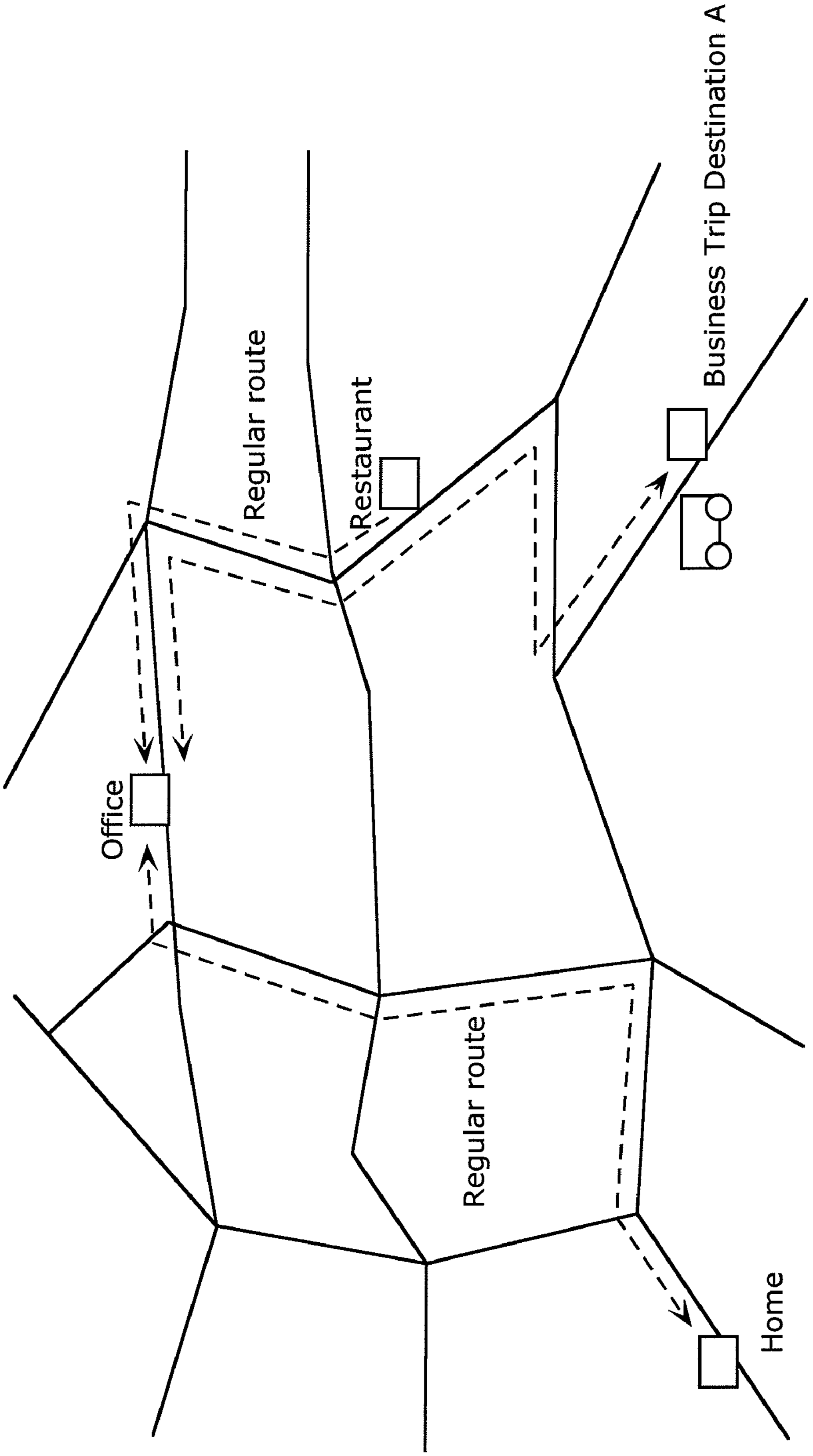
FIG. 16 is a diagram showing a map according to the second modification of the first embodiment.

For example, as shown in FIG. 16, a regular route from a home to an office is accumulated as a travel history of vehicle. Furthermore, a route between the office and a restaurant is also accumulated as a regular travel. Here, in the case of travelling from the office to Business Trip Destination A for the first time, although a travel history from the office to Business Trip Destination A is accumulated, a travel history in which Business Trip Destination A is a departure point does not exist when departing from Business Trip Destination A. Consequently, a destination is predicted using past stay characteristics.

Figure 17:
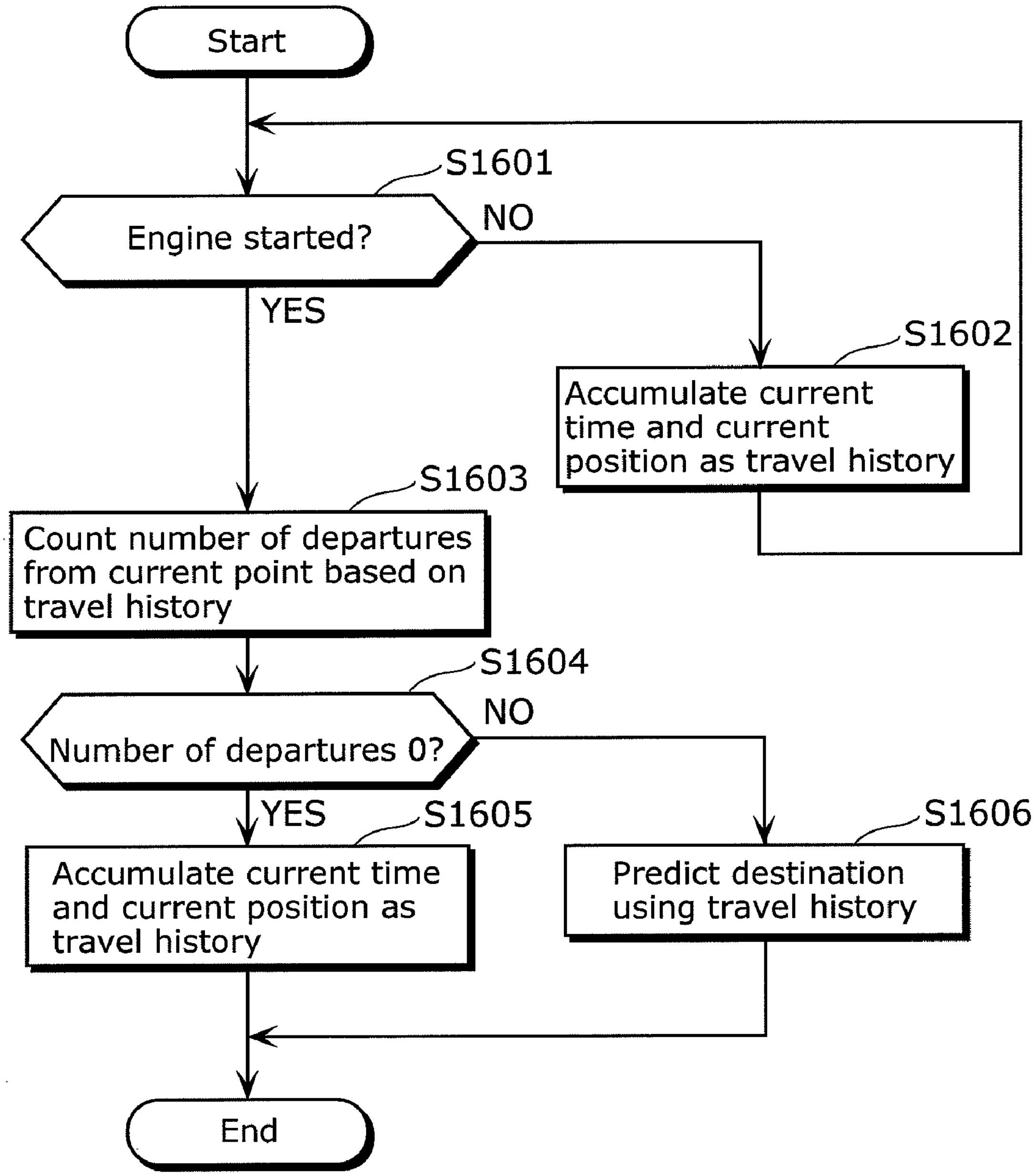
FIG. 17 is a diagram showing a flow chart according to the second modification of the first embodiment.

The above operations will be described with reference to the flow chart shown in FIG. 17. First, it is judged whether or not an engine of vehicle is started (S1601).

When the engine is not started, the process proceeds to S1602. When the engine is started, the process proceeds to S1603. When the engine is not started but the vehicle is moving, a current time and a current position are accumulated as a travel history by the travel history accumulating unit 1401 (S1602). After the accumulation, the process returns to S1601.

In the case where the engine has been started, the number of departures from a current point is counted by the number of departures counting unit 1402 based on the travel history accumulated by the travel history accumulating unit 1401 (S1603).

It is judged whether or not the number of departures is zero (S1604). In the case where the number is not zero, that is, it is not the first departure, as the travel history in which the current point is a departure point is accumulated by the travel history accumulating unit 1401, the process proceeds to S1606 and a destination is predicted using the travel history. Note that the method, for example, disclosed in Patent Reference: WO 2004/034725, can be applied in predicting the destination using the travel history.

In the case of the first departure, as the travel history in which the current point is the departure point is not accumulated, the process proceeds to S1605 and a destination is predicted using the stay characteristic accumulating unit 103.

As a result of the above operations, it is possible to predict the destination using both the travel history and the stay characteristic, based on the number of departures from the point at a time when the engine is started.

Note that, in the present embodiment, the destination prediction method has been modified by incorporating the number of departures from the point where the engine is stared. In the case of predicting a destination at a predetermined intersection, the method may be switched to a destination prediction method using the number of times each intersection is passed.

Third Modification of First Embodiment

The following modification in which a destination is predicted selectively using past travel histories or past stay characteristics when a point is departed from can be considered as another method.

For instance, when, in order to predict a destination at a departure time of a point, there is not enough number of travel histories of departing from the point in the past, it is possible to predict the destination using the past stay characteristic at the point to be a destination candidate.

Furthermore, in the case where there is enough number of departures from the point, there may be destination candidates as a result of the prediction based on the past travel histories. In this case, a destination may be predicted using stay characteristics of points to be destination candidates.

Moreover, although a point is departed from at 18:00, there is a case where only a past history of departing from the point in the morning is accumulated as a past history of departing from the point. In this case, it is possible to narrow down a destination using stay characteristics of points to be destination candidates.

Figure 18:
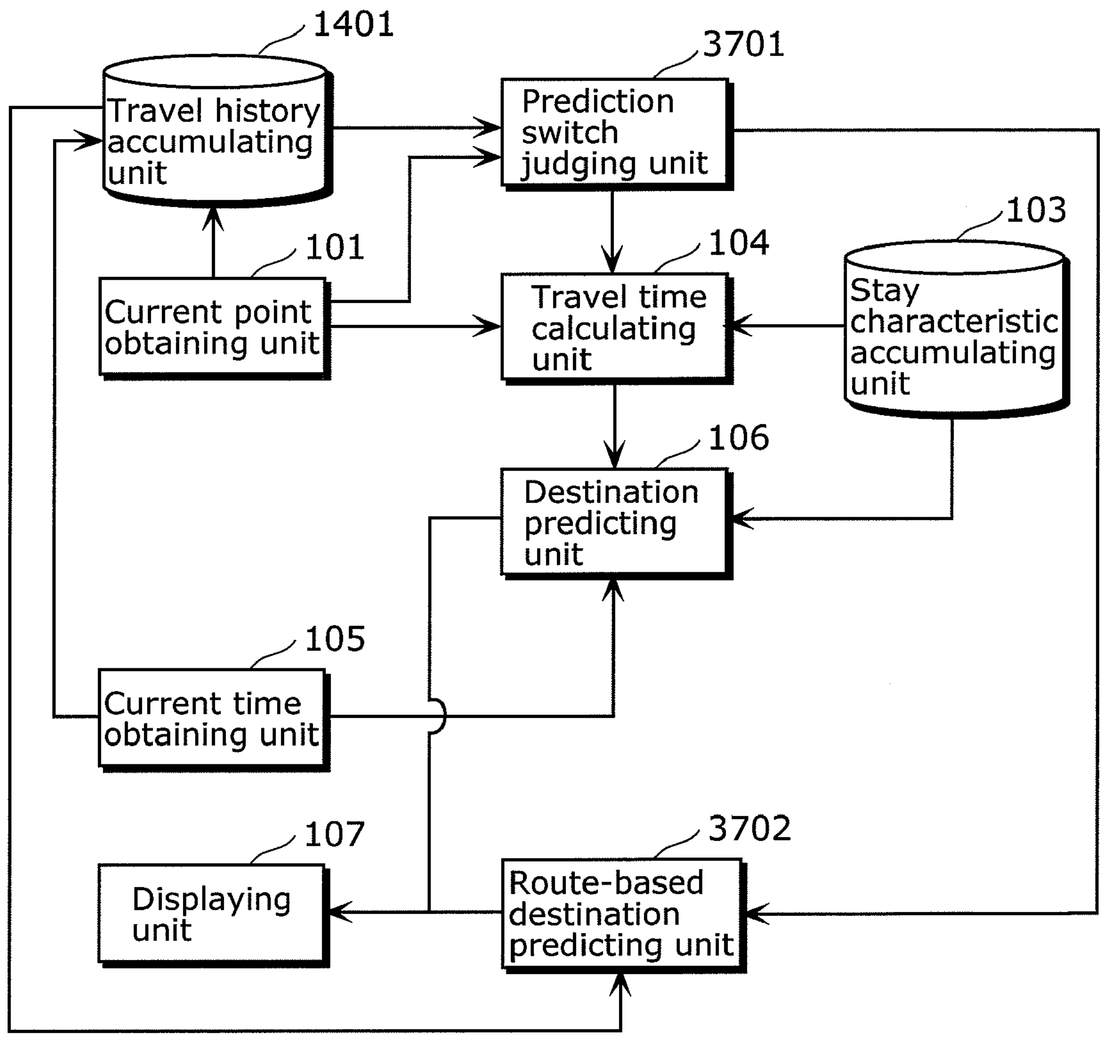
FIG. 18 is a diagram showing a system structure according to a third modification of the first embodiment.

In order to realize the above function, as shown in FIG. 18, a prediction switch judging unit 3701 which judges whether a destination is predicted based on a stay characteristic obtained from the accumulated travel history of the travel history accumulating unit 1401 or using a route is further provided to the system structure shown in FIG. 15.

For example, in the case where a vehicle attempts to depart from a point, only when the number of departures from the point accumulated by the travel history accumulating unit 1401 is not more than five times, the prediction switch judging unit 3701 judges that the destination predicting unit 106 predicts a destination. Conversely, in the case where there is a history of departing more than five times, as a travel route from the point is accumulated by the travel history accumulating unit 1401, it is judged that the destination is predicted using a past travel route indicated by the travel history.

In the case where the prediction switch judging unit 3701 judges that the destination is predicted using the past travel route, a route-based destination predicting unit 3702 predicts the destination using the past travel route, using a current departure point or a passed intersection. The method, for example, disclosed in the above-mentioned Patent Reference: WO 2004/034725, can be applied in the prediction.

In addition, the prediction switch judging unit 3701 may judge switching of a prediction method in consideration of not only the number of the past departures but also a departure time.

For instance, when a vehicle attempts to depart from a point, there is a case where only a history of departing from the point in the morning is accumulated as a past travel history by the travel history accumulating unit 1401. In the case of departing from the point in the evening, as a destination is predicted based on a life pattern of departing in the morning if the destination is predicted using the past travel history, an appropriate result of the prediction may not be outputted.

Although, in the case where, when departing from a departure point, there is a travel history of departing at a time whose difference with the departure time is within 3 hours before and after the time, the prediction switch judging unit 3701 judges that the route-based destination predicting unit 3702 predicts a destination; in other cases, it is judged that a destination is predicted using a stay characteristic.

Figure 19:
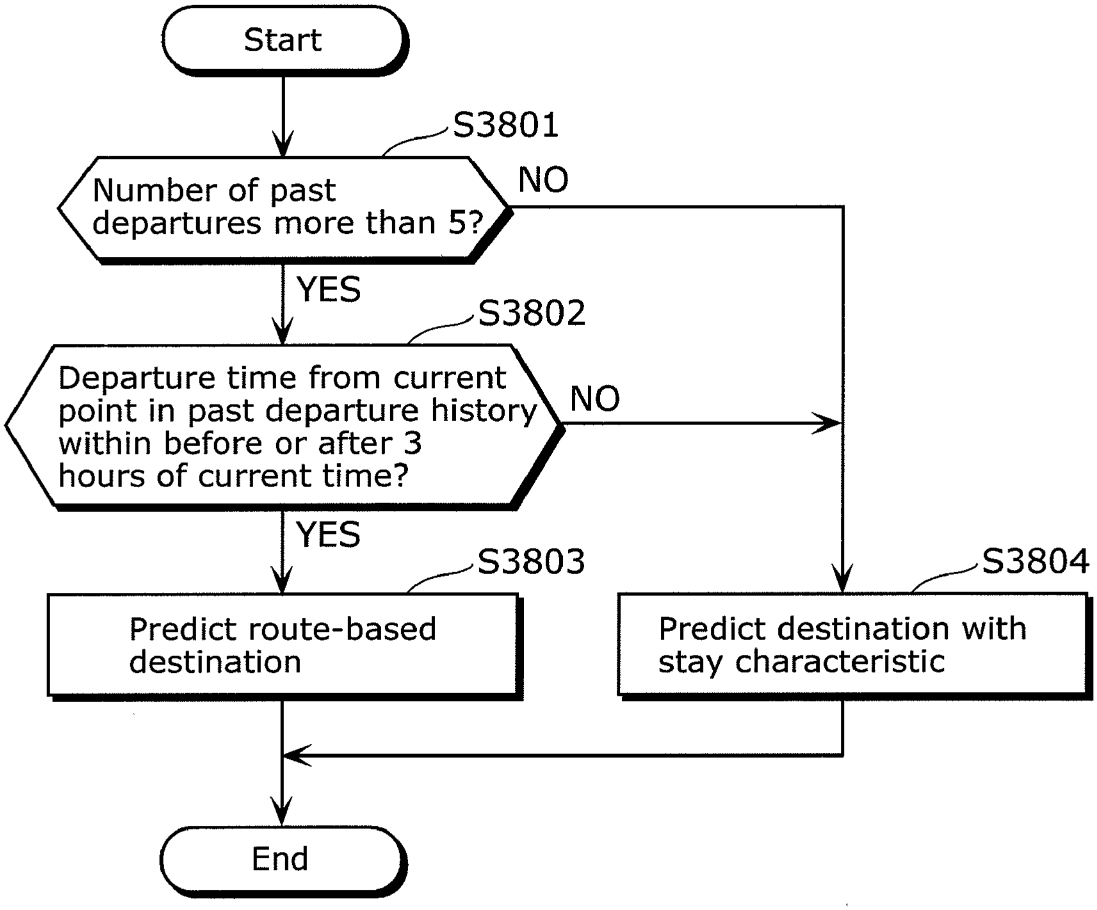
FIG. 19 is a flow chart according to the third modification of the first embodiment.

FIG. 19 is a flow chart showing processing performed by the prediction switch judging unit 3701. Note that processing performed by other than the prediction switch judging unit 3701 is the same as in the first embodiment, and will thus not be described.

In the flow chart shown in FIG. 19, first, it is searched whether or not a travel history in which a current point is a departure point is accumulated by the travel history accumulating unit 1401. In the case where there are more than five such travel histories, the process proceeds to step 3802 (S3801). In the case where there are less than four, a destination is predicted using a stay characteristic (S3804).

Next, in the case where there is the travel history in which the current point is the departure point, if a departure time is within 3 hours before and after a current departure time (S3802), the destination is predicted using a past travel route (S3803). In the case where there is no history of departing 3 hours before and after, the destination is predicted using the stay characteristic (S3804).

As described above, unlike a case where the destination is predicted constantly using the past travel histories as before, when sufficient accuracy cannot be expected in predicting a destination, it is possible to predict a destination using the past stay characteristics. Furthermore, in the system structure shown in FIG. 18, prediction may be performed by both modules—the destination predicting unit 106 which predicts a destination using a stay characteristic and the route-based destination predicting unit 3702 which predicts a destination using a past travel route, and a prediction result obtained by combining these results may be displayed by the displaying unit.

Second Embodiment

In the first embodiment, the stay characteristic information of each point is extracted using the information set by the vehicle driver or the business hours information of the commercial facility, and the destination is predicted using, along with the stay characteristic information, the arrival time at each point estimated from the current point and current time.

Figure 20:
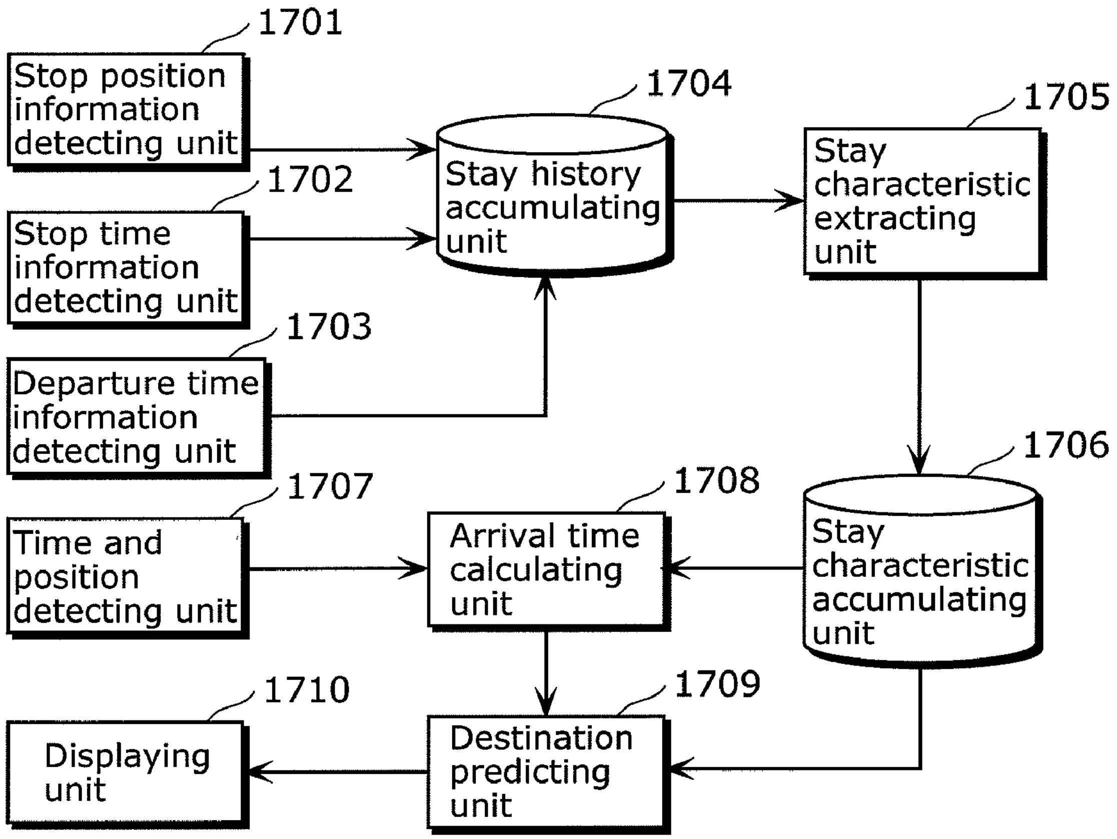
FIG. 20 is a diagram showing a system structure according to a second embodiment.

In the second embodiment, an apparatus which extracts stay characteristic information from information on a driver's history of entering a stopped state at each point and predicts a destination will be described. FIG. 20 shows a system structure. A destination prediction apparatus shown in FIG. 20 includes: a stop position information detecting unit 1701; a stop time information detecting unit 1702; a departure time information detecting unit 1703; a stay history accumulating unit 1704; a stay characteristic extracting unit 1705; a stay characteristic accumulating unit 1706; a time and position detecting unit 1707; an arrival time calculating unit 1708; a destination predicting unit 1709; and a displaying unit 1710.

Here, the stay history accumulating unit 1704 is an example of a travel history accumulating unit, and the stay characteristic extracting unit 1705 is an example of a stay characteristic extracting unit.

An operation of each module will be described.

The stop position information detecting unit 1701 detects whether a vehicle has entered a stopped state or is moving by detecting engine on/off information of the vehicle. Note that, in the case where position detection by GPS and the like verifies that the vehicle has been staying at the same place for more than a predetermined time, it may be judged that the vehicle has entered the stopped state. In this case, it is necessary to set a threshold of the predetermined time so that it can be judged whether the vehicle has been brought to a stop at a traffic light and the like or has entered the stopped state by parking.

The stop time information detecting unit 1702 detects a start time of entering the vehicle's stopped state. The detection is made possible by recording a time when the vehicle's engine is stopped. Furthermore, in the case of detecting a stay from position information of the vehicle's GPS and the like, the position information obtained from the GPS and information on a time of the detection are always accumulated. In the case where the stop position information detecting unit 1701 judges that the vehicle has entered the stopped state at a position, a time when the vehicle arrives at the position is detected as a start time of entering the stopped state.

The departure time information detecting unit 1703 detects, from the stop position detected by the stop position information detecting unit 1701, a time when the vehicle's engine is started for departure as a departure time. Note that, although the start of the vehicle's engine cannot be detected, in the case of entering the stopped state at the position detected by the stop position information detecting unit 1701 and in the case where the position information of the vehicle is subsequently changed, a time when the change occurs is detected as a departure time of the vehicle.

Figure 22:
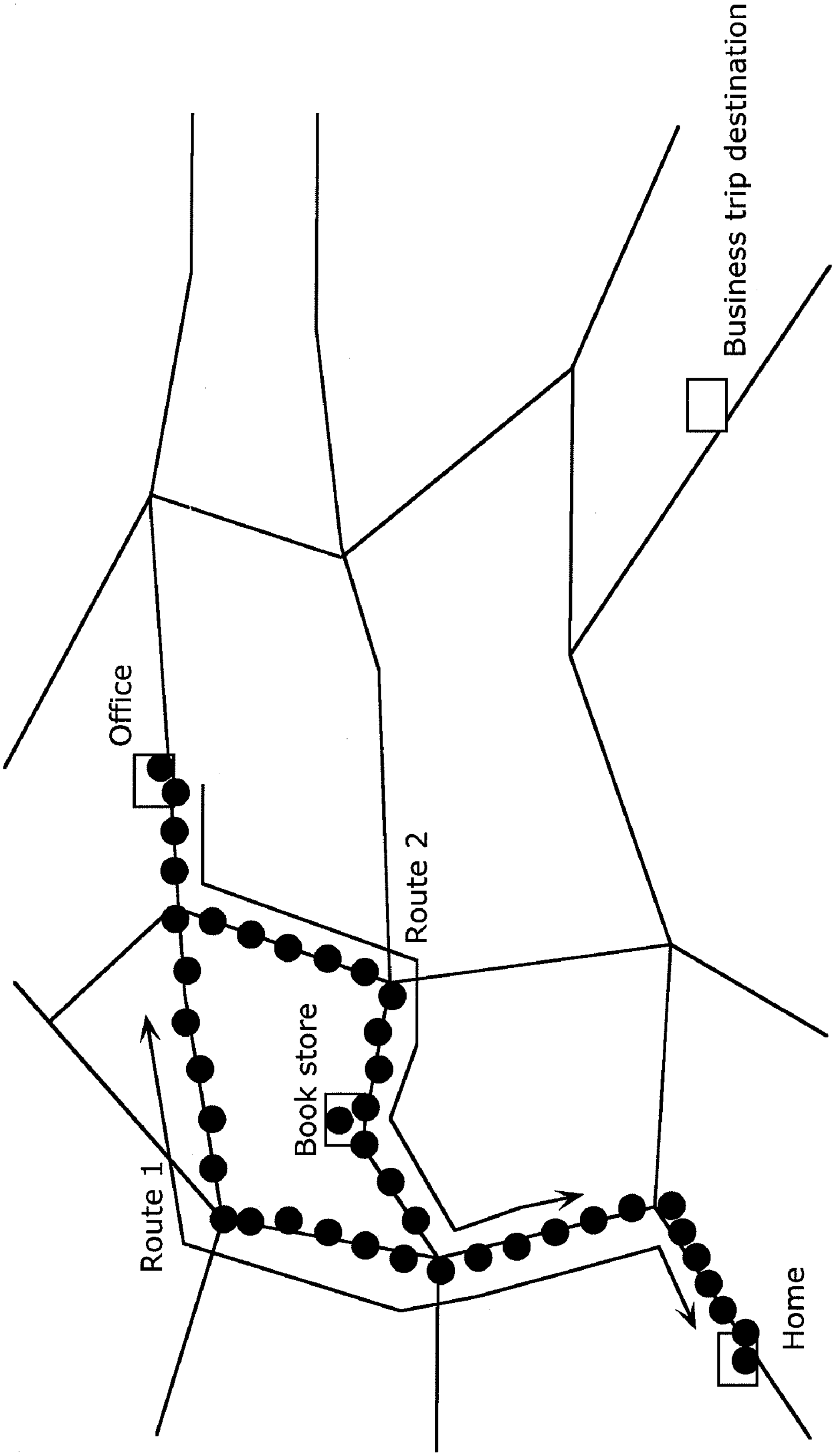
FIG. 22 is a diagram showing a map according to the second embodiment.

The stay history accumulating unit 1704 accumulates information from the stop position information detecting unit 1701, the stop time information detecting unit 1702, and the departure time information detecting unit 1703 as a stay history which is a kind of travel history information. As shown in FIG. 21, for instance, the stay history accumulating unit 1704 accumulates stay histories. The first line in FIG. 21 shows a history of entering a stopped state at a home (latitude of 34.41 and longitude of 135.52) at 20:18 on October, 12, and the second line shows a history of departing from the home at 8:23 on October, 13. In this way, stay history data is increasingly accumulated. Although, as actual travel histories, a vehicle is moving on each route with respect to points, such as a home, a bookstore, and an office, as shown in FIG. 22, only a stay history at each point is accumulated as a history.

The stay characteristic extracting unit 1705 extracts a stay characteristic of the vehicle from the stay histories accumulated by the stay history accumulating unit 1704. For example, a stay characteristic at a home will be examined in FIG. 23. Based on a past stay history, a stopped state at "Home" has been entered between 19:10 and 21:45. Moreover, a characteristic of departing from the home between 7:10 and 7:30 is extracted. By contrast, as to a stay characteristic at office, there is a stay characteristic of always entering the stopped state between 8:40 and 8:50 and of departing from the office between 17:25 and 21:44. A variation in a return home time is greater than the start time of entering the stopped state.

Note that, hereinafter, the stopped state and arrival are synonymous and used as an example of a stay start.

The stay characteristic accumulating unit 1706 accumulates the characteristic extracted by the stay characteristic extracting unit 1705. For instance, as shown in FIG. 24, the start time of entering the stopped state and the departure time are accumulated for each stay point.

The time and position detecting unit 1707 detects a current position of the vehicle and a current time.

Figure 25:
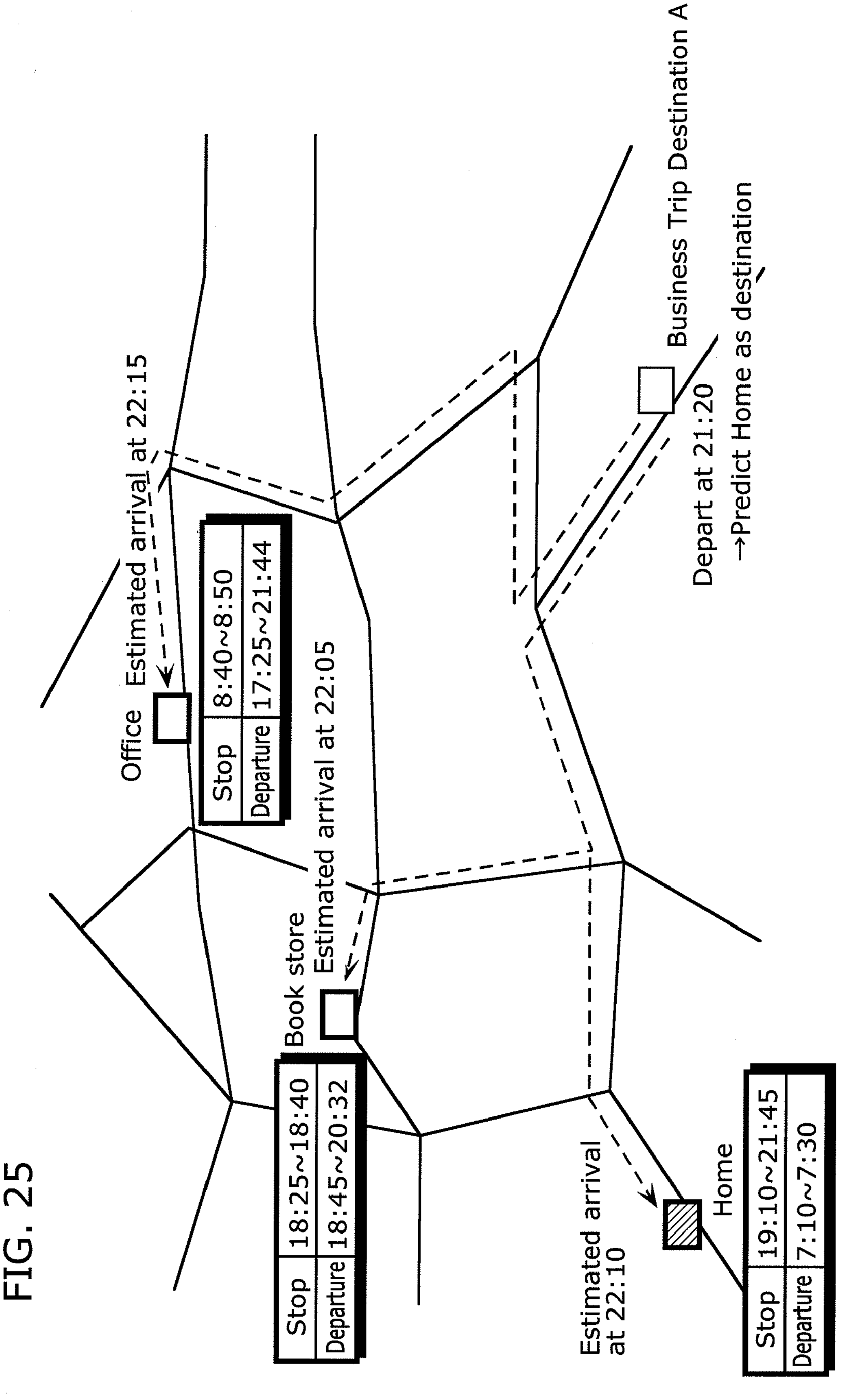
FIG. 25 is a diagram showing a map according to the second embodiment.

The arrival time calculating unit 1708 calculates, for points having stay characteristics accumulated by the stay characteristic accumulating unit 1706, arrival times using distances between the points and route costs, based on the current position of the vehicle and the current time detected by the time and position detecting unit 1707. For instance, as shown in FIG. 25, when Business Trip Destination A is departed from at 21:20, the estimated arrival time at "Home" is 22:10, the estimated arrival time at "Office" is 22:15, and the estimated arrival time at "Bookstore" is 22:05, Home, Office, and Bookstore being the points accumulated by the stay characteristic accumulating unit 1706.

At a time predicted by the arrival time calculating unit 1708, the destination predicting unit 1709 predicts, as a destination, a point where a probability of staying at that time is high, based on the stay characteristics accumulated by the stay characteristic accumulating unit 1706. In the present example, as shown in FIG. 24, at each time, only "Home" shows the history of staying at the point. Specifically, there is the history of staying at "Home" at 22:210. There is no history of staying at Office at 22:15. In addition, there is no history of staying at Bookstore at 22:05. Accordingly, the destination is predicted as “Home”.

Figure 26:
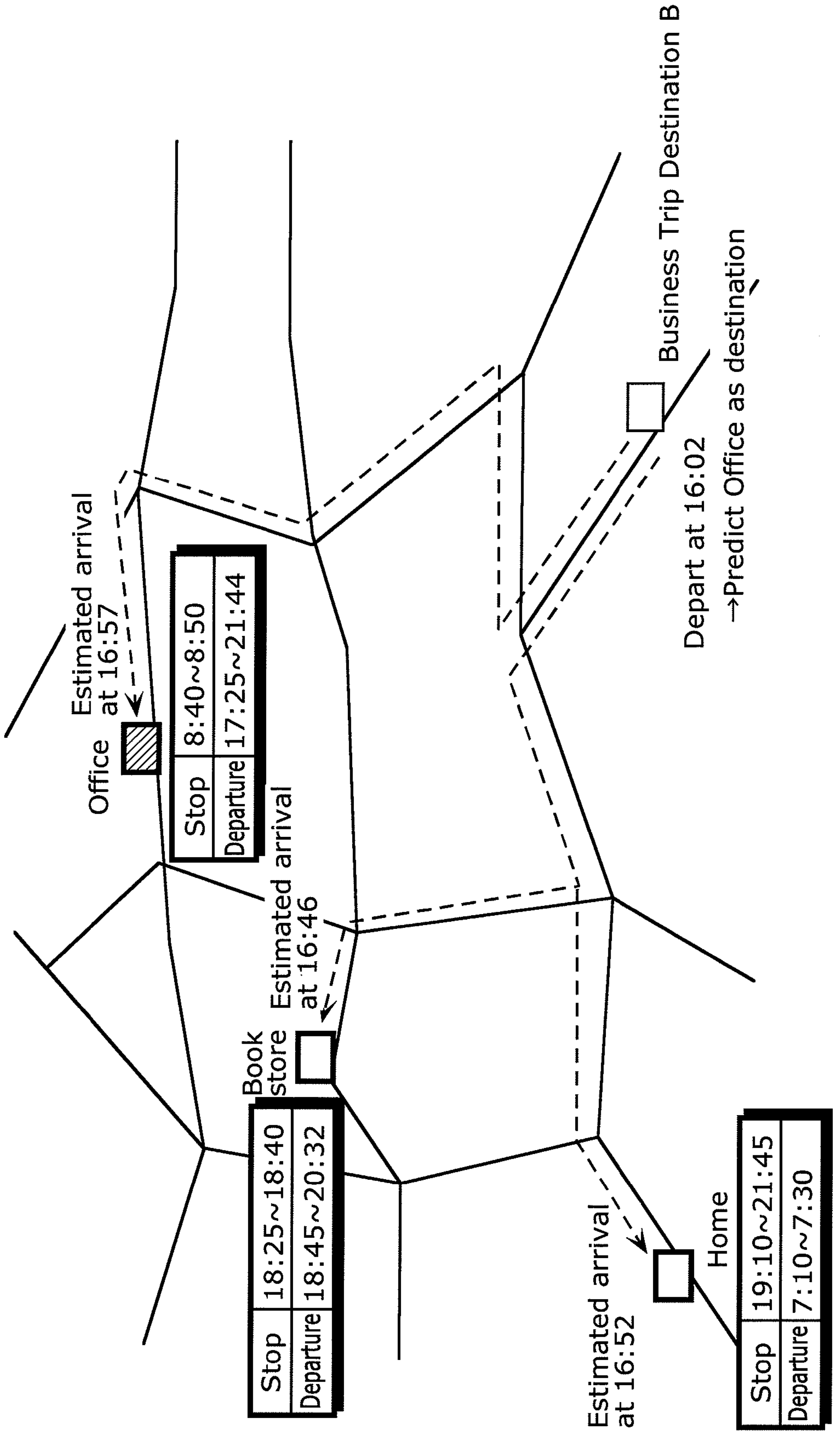
FIG. 26 is a diagram showing a map according to the second embodiment.

In the above example, although the example of departing from the business trip destination at 21:20 has been described, when the same point is departed from at 16:02, as shown in FIG. 26, a destination becomes “Office”. In this way, although the same point is departed from, it is possible to determine the destination depending on the departure time.

Figure 27:
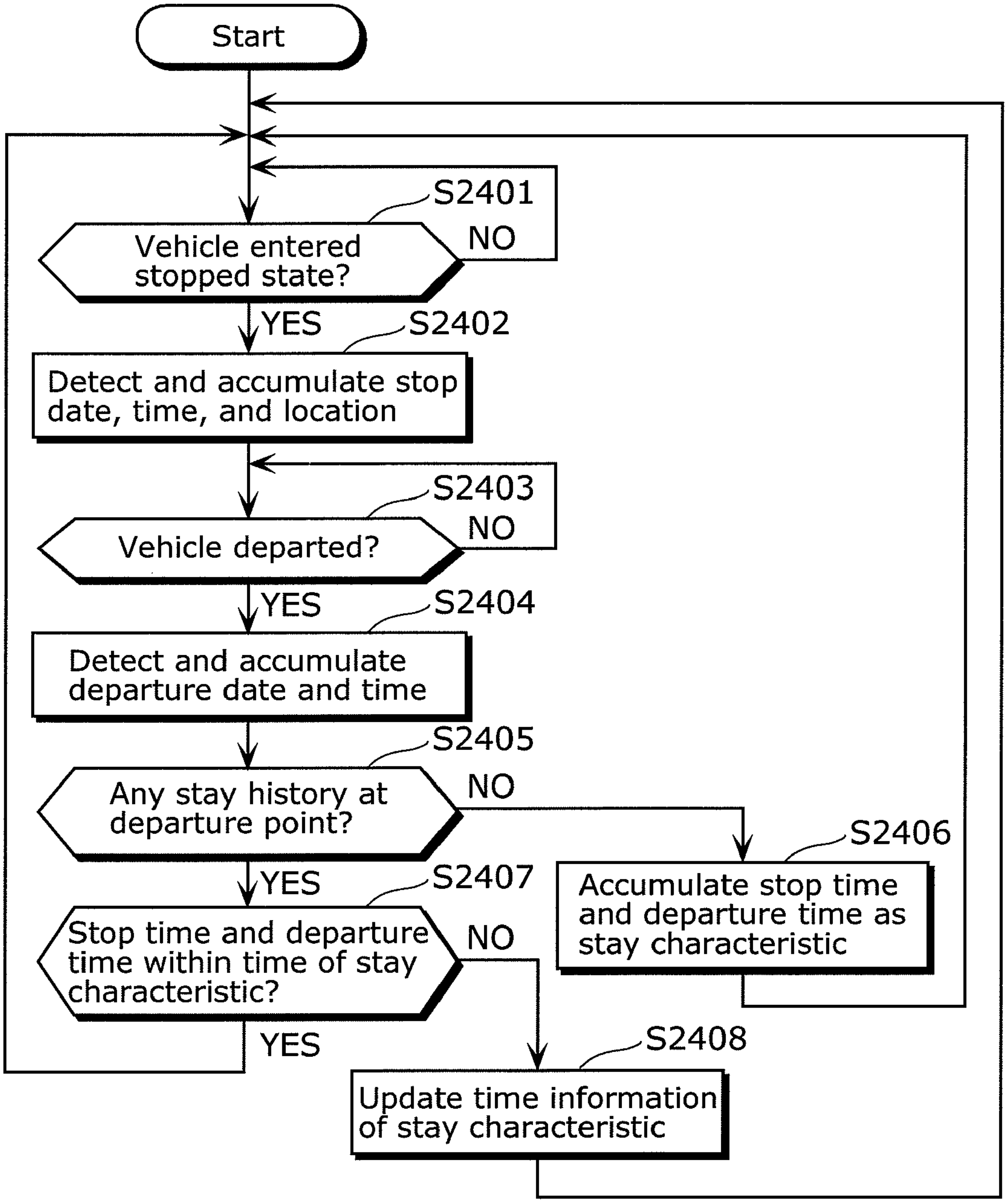
FIG. 27 is a diagram showing a flow chart according to the second embodiment.
Figure 28:
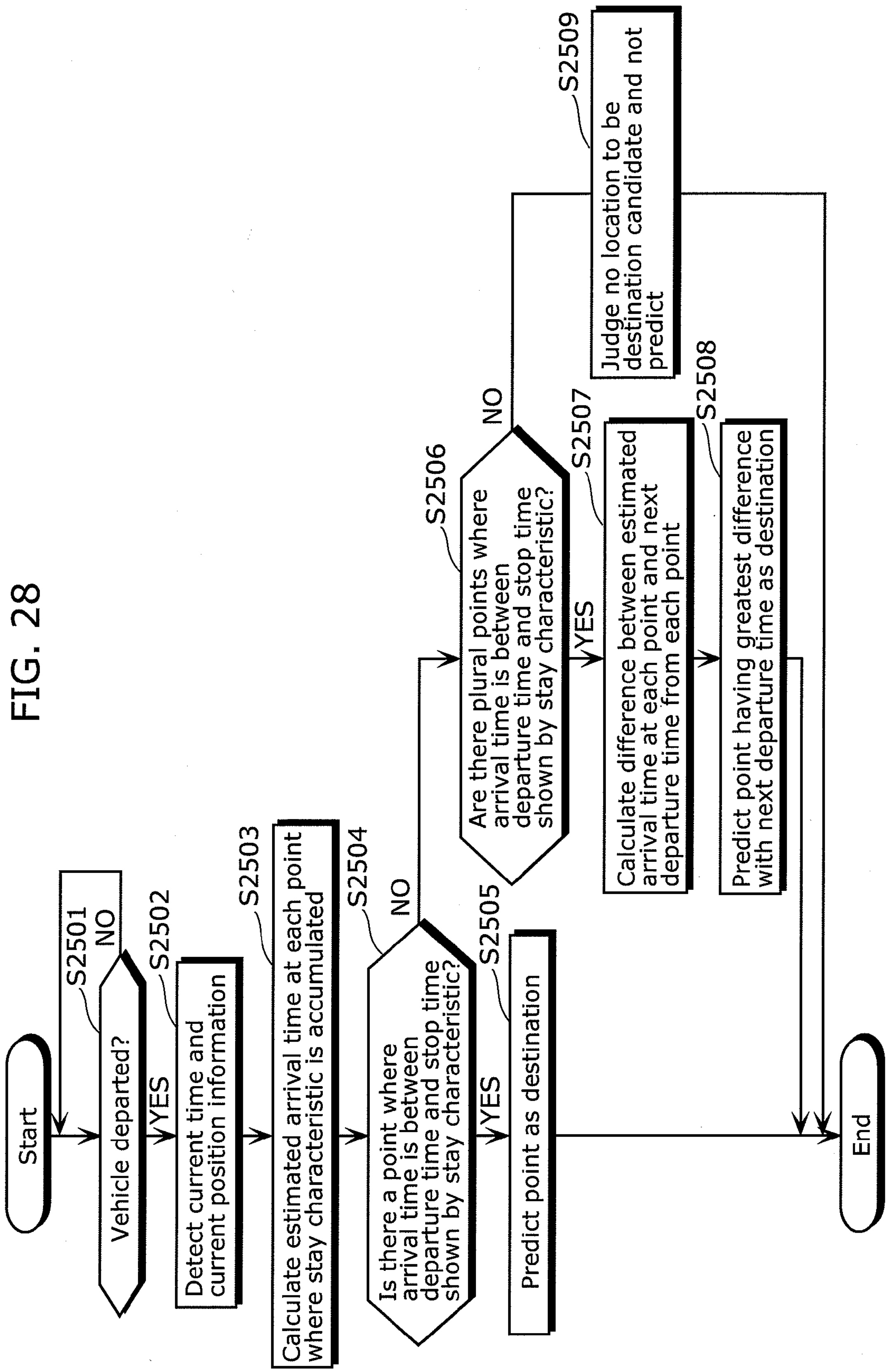
FIG. 28 is a diagram showing a flow chart according to the second embodiment.

The above operation flow will be described with reference to flow charts shown in FIGS. 27 and 28. FIG. 27 is the flow chart showing processing of accumulating histories to extract stay characteristics of a vehicle. The processing flow will be described first.

It is judged whether or not the vehicle has entered a stopped state (S2401). In the case where the vehicle has entered the stopped state, the process proceeds to S2402. In the case where the vehicle has not entered the stopped state, S2402 is repeated. In the case where the vehicle has entered the stopped state, the stop position information detecting unit 1701 detects a stop position and a stop date of the vehicle and registers the stop position and the stop date with the stay history accumulating unit 1704 (S2402).

Next, it is judged whether or not the vehicle has departed (S2403). The present step (S2403) is repeated until the vehicle departs. When the vehicle departs, the processing proceeds to S2404. The departure time information detecting unit 1703 detects a departure time, and the stay history accumulating unit 1704 accumulates the departure time (S2404). The stay history accumulating unit 1704 judges whether or not there are stay histories accumulated in S2404 (S2405). As a result of the judgment, in the case where the stay histories have not been accumulated, a new stay history is registered, and the stay characteristic extracting unit 1705 updates a stay characteristic (S2406).

In the case of a point that has been already stayed in S2405, it is judged whether or not the detected stop time and departure time are within a stay period in the past indicated by the stay characteristic (S2407). Consequently, in the case where they are within the stay period in the past, the processing returns to S2401 without extracting the stay characteristic. In the case where they are not within the stay period in the past, the stay characteristic extracting unit 1705 extracts the stay characteristic and updates the stay characteristics accumulated by the stay characteristic accumulating unit. The processes up to this point are processes for accumulating the stay histories each of which indicates the history of entering the stopped state and departing and for extracting the stay characteristic.

Next, a processing flow of predicting a destination using the accumulated stay characteristics with reference to the flow chart shown in FIG. 28 will be described.

It is judged whether or not the vehicle has departed (S2501). In the case where the vehicle has not departed, the present step is repeated. When the departure of vehicle is detected, the time and position detecting unit 1707 detects a current time and a departure location (S2502). Based on the detected time and departure location, the arrival time calculating unit 1708 calculates an estimated arrival time in the case of heading to a point accumulated by the stay characteristic accumulating unit 1706 (S2503).

It is judged whether or not the estimated arrival time at each point falls between the stop time and the departure time, and is judged whether or not the number of points is one (S2504). In the case where the number of points detected in S2504 is one, it is judged that the point is the destination (S2505). In the case where the number of points detected in S2504 is not one, the process proceeds to S2506.

It is judged whether or not the number of points detected is more than two (S2506). In the case where there are more than two, the process proceeds to S2507. In the case where there is none, the process proceeds to S2509. In the case where there are more than two, a difference between the estimated arrival time at each point and a next departure time at each point is calculated (S2507). A point where the difference calculated in S2507 is the largest is predicted as the destination (S2508). Moreover, in the case where the number of points detected in S2508 is none, it is determined that destination prediction is difficult, and the prediction is not performed (S2509).

A case where the estimated arrival times at the points fall between the arrival time and the departure time accumulated by the stay characteristic accumulating unit 1706 when the arrival time calculating unit 1708 calculates the estimated arrival time at each point will be described with reference to FIG. 29.

Figure 29:
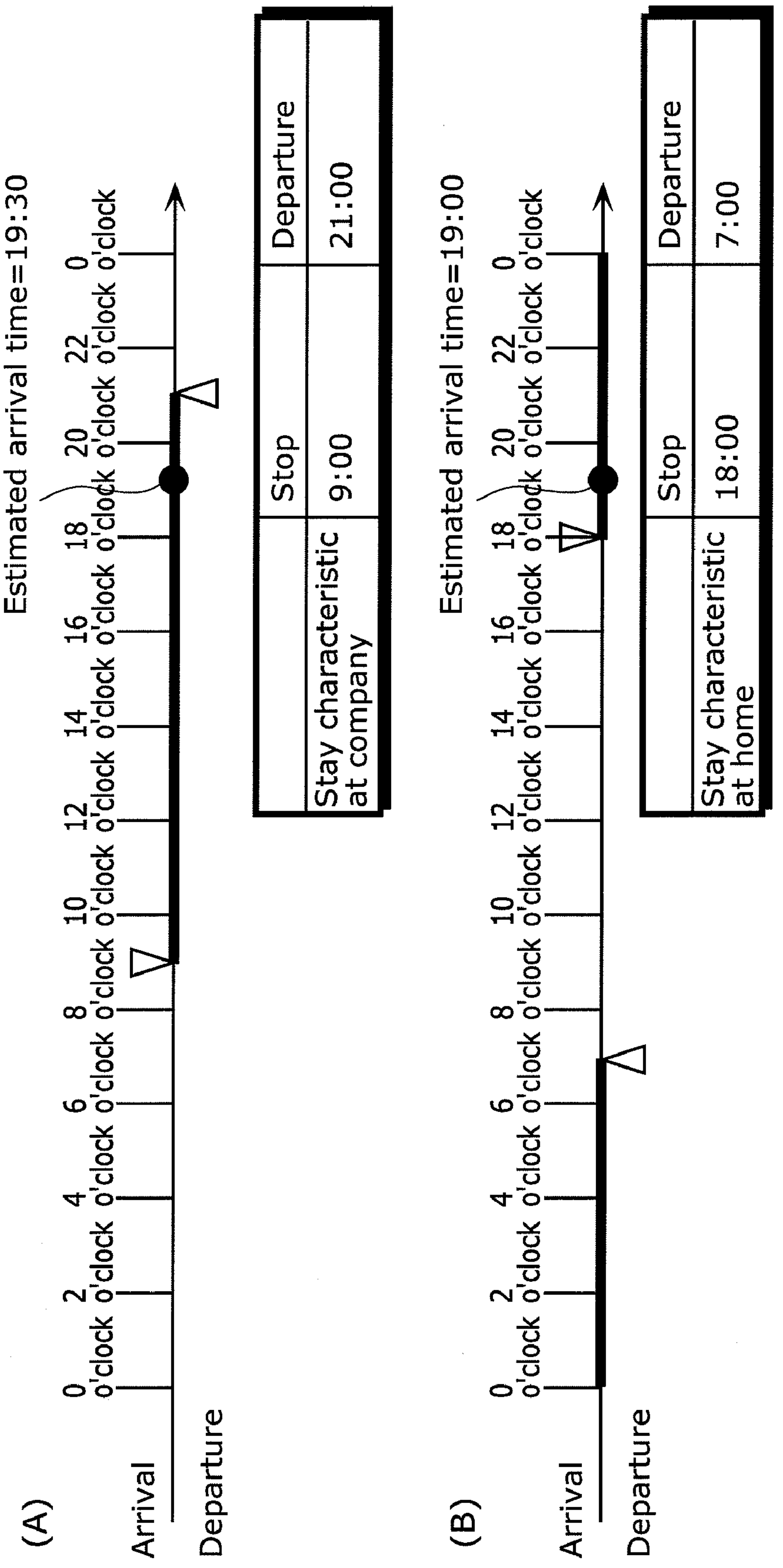
FIGS. 29A and B is a diagram showing examples of stay conditions according to the second embodiment.

In FIG. 29, a stay characteristic at an office in which a start time of entering a stopped state is 9:00 and a departure time is 21:00 is accumulated as a stay characteristic. Furthermore, a stay characteristic at a home in which a start time of entering a stopped state is 18:00 and a departure time is 7:00 is accumulated as a stay characteristic. When a point is departed from at 18:30, it is assumed that an estimated arrival time at the office is calculated as 19:30 and that an estimated arrival time at the home is calculated as 19:00.

As stated above, in the case where the estimated arrival times at the points are included in the stay period (between the stop time and the departure time), it is predicted that, among the points, a point having a longer interval time between an estimated arrival time and a next departure time is headed for. This means that, in the case where it is necessary to depart immediately after the arrival, it is judged to be highly probable that a purpose at the point cannot be accomplished.

For example, this is because, in the case of the present example, even if the office is reached at 19:30, when there is a stay characteristic of departing at 21:00, it can be considered difficult to work and the like. In this case, it is predicted that the home having a long interval time between the estimated arrival time and the next departure time is headed for.

Moreover, in the case where there is a probability to be a destination with respect to the points, an average of the arrival times may be calculated for each point, and a point having a minimum difference between the estimated arrival time and the average arrival time may be predicted as the destination.

Figure 30:
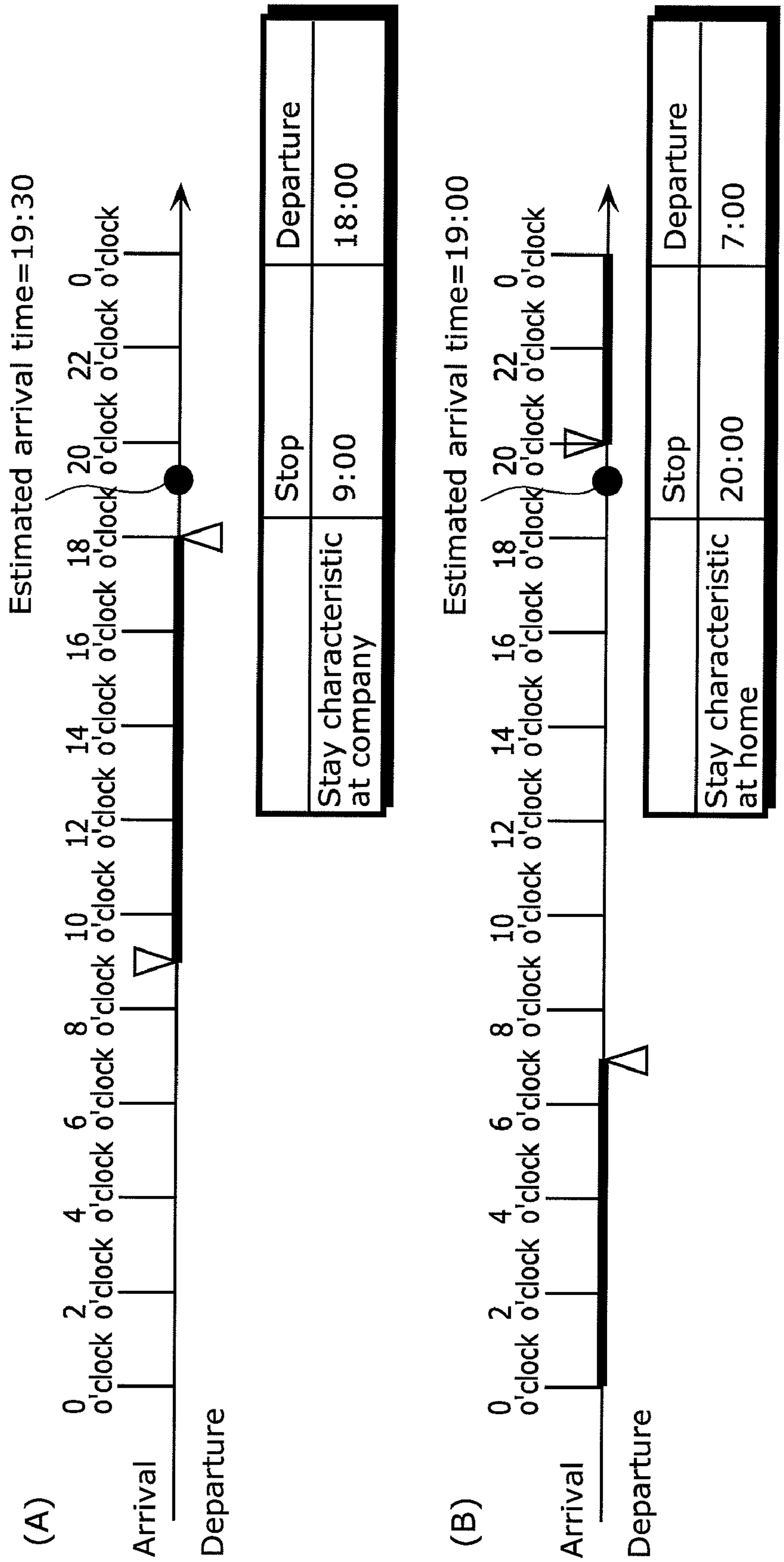
FIGS. 30A and B is a diagram showing examples of stay conditions according to the second embodiment.

As another example, a case where an estimated arrival time at any point does not fall between the arrival time and the departure time accumulated by the stay characteristic accumulating unit 1706 when the arrival time calculating unit 1708 calculates the estimated arrival time at each point will be described with reference to FIG. 30.

In the case where the estimated arrival time at each point is not included in the stay time at each point, it is judged that a stay point having a stop time later than the estimated arrival time is a future destination. In this example, when the departure time precedes the estimated arrival time, it can be judged that it is difficult to accomplish the purpose at the point, and when the start time of entering the stopped state is preceded by the estimated arrival time, it can be judged that the arrival at the point is earlier. As stated above, in the case where the estimated arrival time is not included in the stay period, it is judged that a point having the difference between the estimated arrival time and the start time of entering the stopped state below a predetermined threshold is a destination. With this, it can be preferentially judged that a point where the start time of entering the stopped state immediately follows after the estimated arrival time is the destination.

As a result of the above operations, the destination can be predicted by extracting the stay characteristic at each point based on the past stay histories and calculating the estimated arrival time from the current point with the characteristic.

Note that, in the present embodiment, in the case where one driver repeats regular driving, it is possible to extract the stay characteristic at each point. However, in the case where one vehicle is used by several people, there is a case where a departure time from a home, and the like, differ. In addition, a departure time and a stop time differ among users depending on whether it is a weekday or a holiday.

Figure 31:
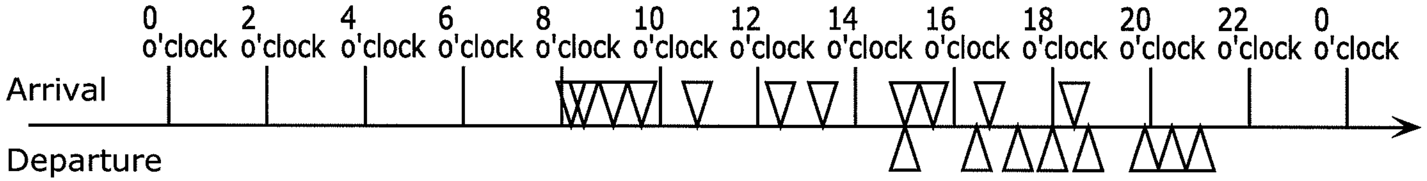
FIG. 31A is a diagram showing an example of stay condition according to the second embodiment, and FIGS. 31B and C is a diagram showing stay characteristic information according to the second embodiment.

For instance, as shown in FIG. 31, according to a distribution of arrival times and departure times, stop times are distributed between 15:00 and 21:00, and the departure times are distributed between 8:00 and 18:30. As the latest departure time is preceded by the earliest stop time, it is not possible to extract stay characteristic information indicating a characteristic stay period.

In this case, a stay characteristic is accumulated by using a return time (arrival time) on a departure time basis. For example, as shown at the bottom of FIG. 31, a time slot for departure is set on a predetermined time basis (e.g. 2 hours), and a frequency of departures is calculated. Next, a return time is calculated when departing in each time slot. For instance, when a departure occurs between 8:00 and 10:00, a return time is between 18:30 and 20:30. This indicates that when the home is departed from in the morning, it is for commuting, and a return home time is between 18:30 and 20:30. Furthermore, when a departure occurs between 10:00 and 12:00, a history of returning between 19:00 and 21:00 is accumulated. By contrast, in the afternoon, for instance, when a departure occurs between 12:00 and 14:00, it is a history of going shopping at a supermarket and the like, and a return home time is about 3 hours after the departure. Moreover, when a departure occurs between 14:00 and 16:00, there is a characteristic of returning home in about 2 hours. In this way, it is possible to predict the destination using the stay characteristic (return home characteristic) in which time slots for returning home differ according to the departure times.

Additionally, in the case of predicting the destination using the stay characteristic, it is necessary to narrow down destination candidates.

A destination that can be predicted using the stay characteristic often tends to be generally a place regularly visited, such as a home and an office. Accordingly, based on a past travel history, points that have been visited for more than a predetermined number of times are narrowed down as destination candidates, stay characteristics are calculated for the destination candidates, and a destination is predicted.

Furthermore, when the number of histories increases, not only the points are narrowed down as the destination candidates by the predetermined number of times, but also points that are regularly visited to some degree, such as points that are visited once a week, may be narrowed down as destination candidates.

Third Embodiment

In the first and second embodiments, when the destination from the predetermined point of the vehicle is predicted, the required time is calculated using the route from the point to another point where the stay characteristic is accumulated.

However, even if a result of calculating an estimated arrival time at each point is used, a vehicle driver does not necessarily act with knowledge of the time. For example, having never encountered traffic congestion on the way to Facility A, a user may head for Facility A without knowing the traffic congestion and the like on the way. When a route from a current point to Facility A is searched and an estimated arrival time is calculated in consideration of traffic congestion information accordingly, the estimated arrival time passes a closing time of the destination and it is judged that the user would not head for Facility A.

Nonetheless, in the case of being unaware of the traffic congestion on the way, the user would directly head for Facility A. As stated above, without considering how the user estimates an arrival time, there is a probability that a destination is predicted wrongly.

Figure 32:
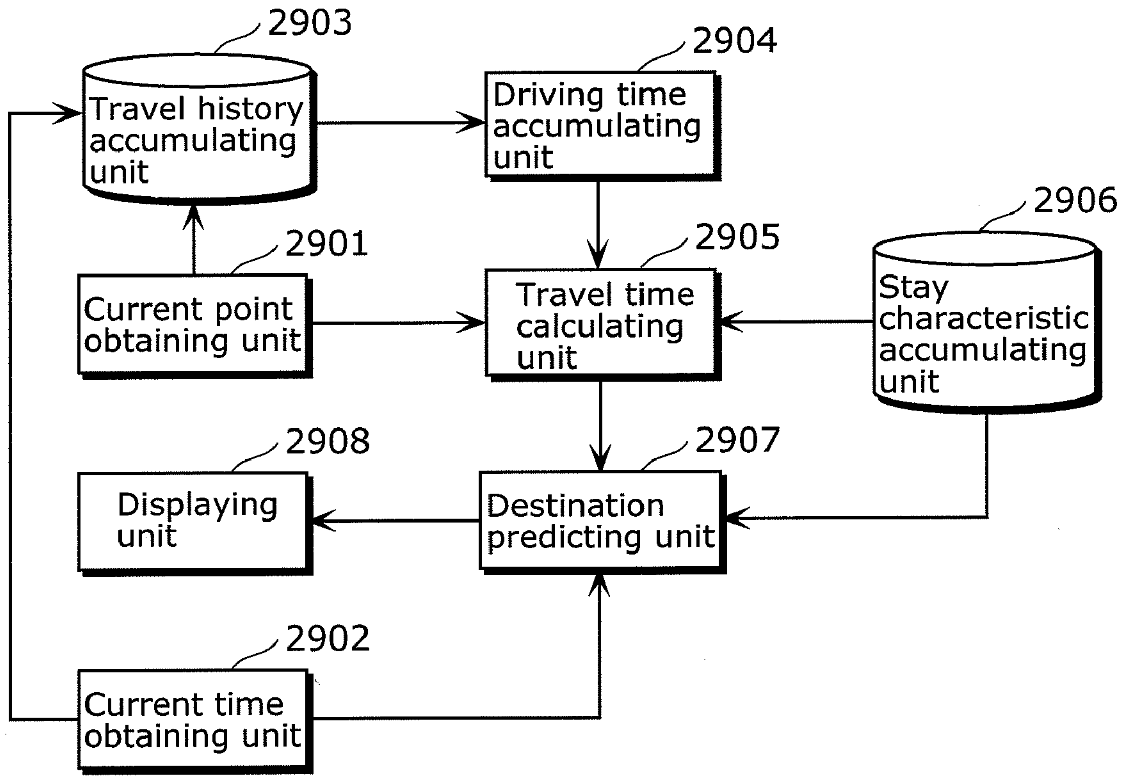
FIG. 32 is a diagram showing a system structure according to a third embodiment.

In the third embodiment, when a destination is predicted using stay characteristics, performance of destination prediction is improved by considering what time a user estimates to arrive at each point. FIG. 32 shows a system structure. A destination prediction apparatus shown in FIG. 32 includes: a current point obtaining unit 2901; a current time obtaining unit 2902; a travel history accumulating unit 2903; a driving time accumulating unit 2904; a travel time calculating unit 2905; a stay characteristic accumulating unit 2906; a destination predicting unit 2907; and a displaying unit 2908.

Here, the travel history accumulating unit 2903 is an example of a travel history accumulating unit.

An operation of each module will be described.

The current point obtaining unit 2901 obtains a vehicle's current point via a GPS antenna and the like.

The current time obtaining unit 2902 detects, with a clock and the like, a time at which vehicle's position information is obtained.

The travel history accumulating unit 2903 accumulates, in chronological order, the current point obtained by the current point obtaining unit 2901 and time information obtained by the current time obtaining unit 2902.

Figure 33:
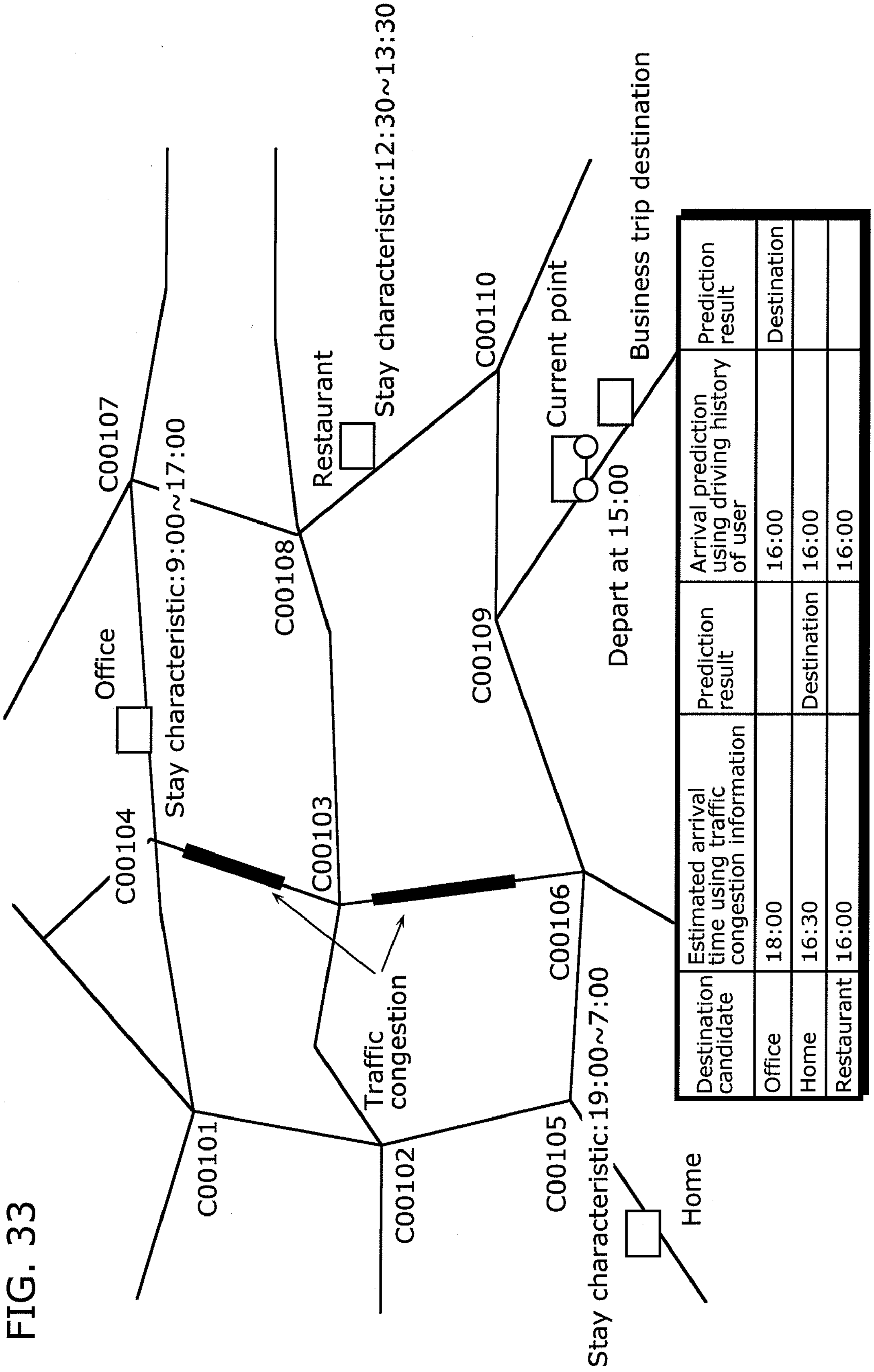
FIG. 33 is a diagram showing a map according to the third embodiment.

The driving time accumulating unit 2904 calculates and accumulates actual travel times between intersections and landmarks based on vehicle's travel histories accumulated by the travel history accumulating unit 2903. For instance, as shown in FIG. 33, in the case where identification information is given to intersections and the like on a map, as shown in FIG. 34, information on a departure point, an arrival point, an average required time between the departure and arrival points, the number of experiences, variation in a required time, and so on is calculated based on the travel histories accumulated by the travel history accumulating unit 2903. For example, in FIG. 34, an average required time for arriving at C00104 after departing from C00101 is 20 minutes. Although the number of driving experiences is five and the average time is 20 minutes, variation is five minutes as a required time has been in a range between 15 minutes at minimum and 25 minutes at maximum.

The travel time calculating unit 2905 calculates a travel time to each point accumulated by the stay characteristic accumulating unit 2906 based on a driving time in each path accumulated by the driving time accumulating unit 2904 and a departure point which is the current point obtained by the current point obtaining unit 2901. For instance, as shown in FIG. 33, it is assumed that a current point is a business trip destination and that a current time is 15:00. When destination candidates accumulated by the stay characteristic accumulating unit 2906 are "Office", "Home", and "Restaurant", a required time is calculated for each destination candidate. Specifically, as shown in FIG. 35, a travel time is searched in each path, and a total time of travel times is calculated. As a result, it is assumed that a calculated driving time is 60 minutes for each point.

The destination predicting unit 2907 predicts a destination based on the travel time calculated by the travel time calculating unit 2905, the current time obtained by the current time obtaining unit 2902, and the stay characteristic at each point accumulated by the stay characteristic accumulating unit 2906. As shown in FIG. 33, when the business trip destination is departed from at 15:00, it is calculated from the calculation result of the travel time calculating unit 2905 that an arrival time at each point is 16:00. The stay characteristic at each point is accumulated by the stay characteristic accumulating unit 2906. It is assumed that stay characteristics at "Home", "Office", and "Restaurant" accumulated are between 19:00 and 7:00, between 9:00 and 17:00, and between 12:30 and 13:30, respectively. Since 16:00 is included only by the stay characteristic at "Office", it is judged that a destination is "Office".

On the other hand, in the case where each route from a current point of the business trip destination is searched and further traffic congestion information and the like can be obtained, it is assumed that an estimated arrival time is calculated in consideration of the information. At this time, as shown in FIG. 33, calculated estimated arrival times at "Office", "Home", and "Restaurant" are 18:00, 16:30, and 16:00, respectively. When a destination is predicted based on the calculation result, the destination is no longer "Office". In the case of arriving at "Office" at 18:00, it is judged that the destination is not "Office" due to an accumulated stay characteristic of not staying after 17:00. However, in the case where a driver is not aware of whether or not there is traffic congestion, the driver judges that it is possible to arrive at "Office" at 16:00 based on usual driving experiences and attempts to head for "Office". As stated above, when the estimated arrival time is calculated, it is necessary to first judge whether the user estimates when to arrive at each destination candidate using a past driving time, and then to predict the destination after comparing with the stay characteristics.

Figure 36:
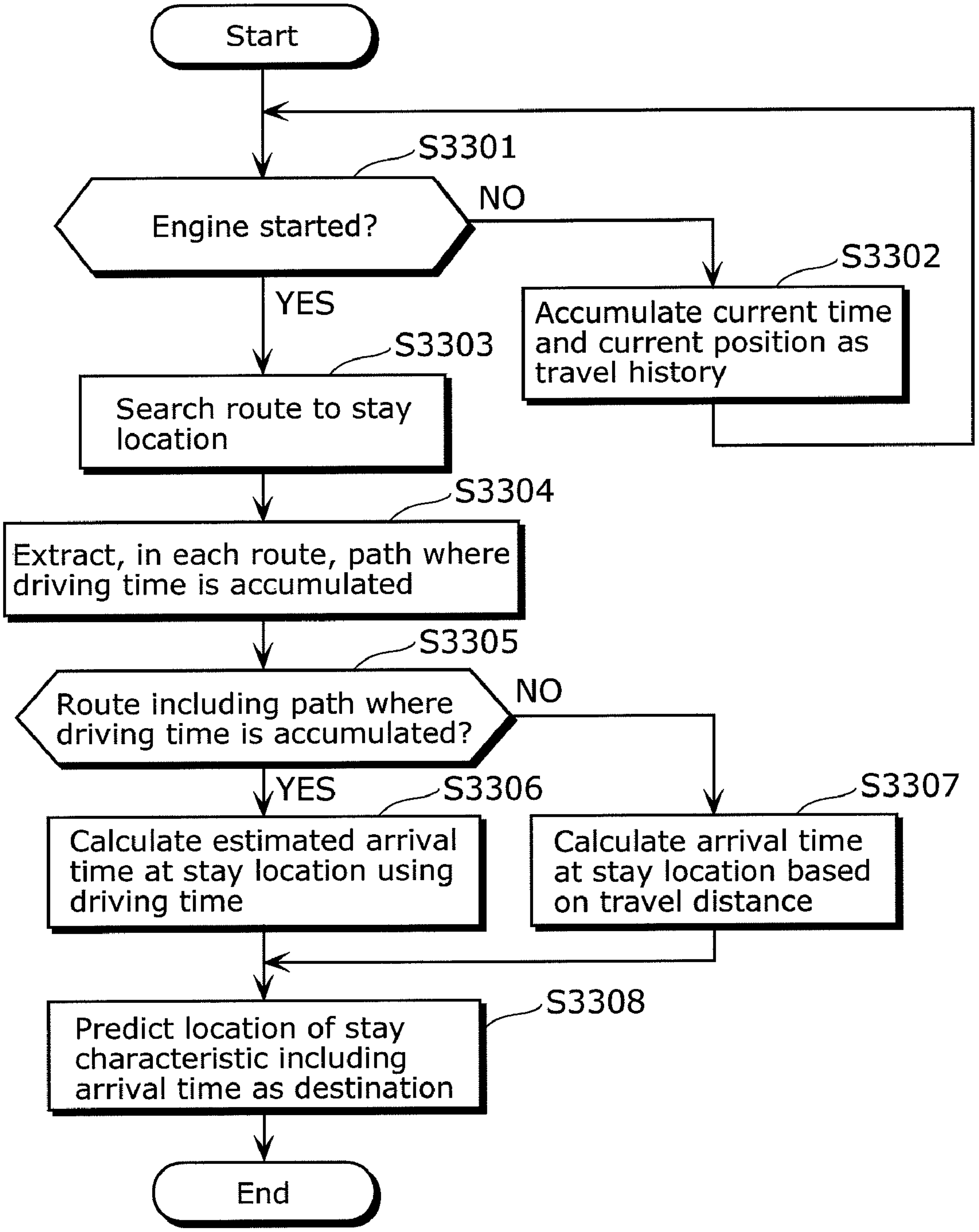
FIG. 36 is a flow chart according to the third embodiment.

The flow of above processing is summarized by a flow chart shown in FIG. 36. First, it is judged whether or not an engine is started (S3301). In the case where the engine is not started, the process proceeds to S3302. In the case where it is not a timing at which the engine is started, a current time and a position are accumulated as a travel history by a travel history accumulating unit. In the case where it is a timing at which the engine is started, a route to a point accumulated by a stay characteristic accumulating unit is searched (S3303). A path in the searched route where a past driving time is accumulated is extracted (S3304). In the case of the route including the path where the driving time is accumulated, the process proceeds to S3306. In the case of the path where the driving time is not accumulated, the process proceeds to S3307. In the case of the path where the driving time is accumulated, a travel time is calculated using the driving time of the path (S3306). In the case of the path where the driving time is not accumulated, a travel time is calculated using a travel distance and an average driving speed (S3307). An estimated arrival time at each point is calculated using results of S3306 and S3307, and a destination is predicted. A destination prediction method is determined in the same manner as in the first and second embodiments.

As a result of the above operations, it is possible to predict the destination using the user's required time for arriving and stay characteristic at each point. In particular, in the present embodiment, as the required time for arriving at the destination is estimated using the user's past driving time, it is possible to predict the destination using the user's estimated required time for arriving at each point.

Figure 37:
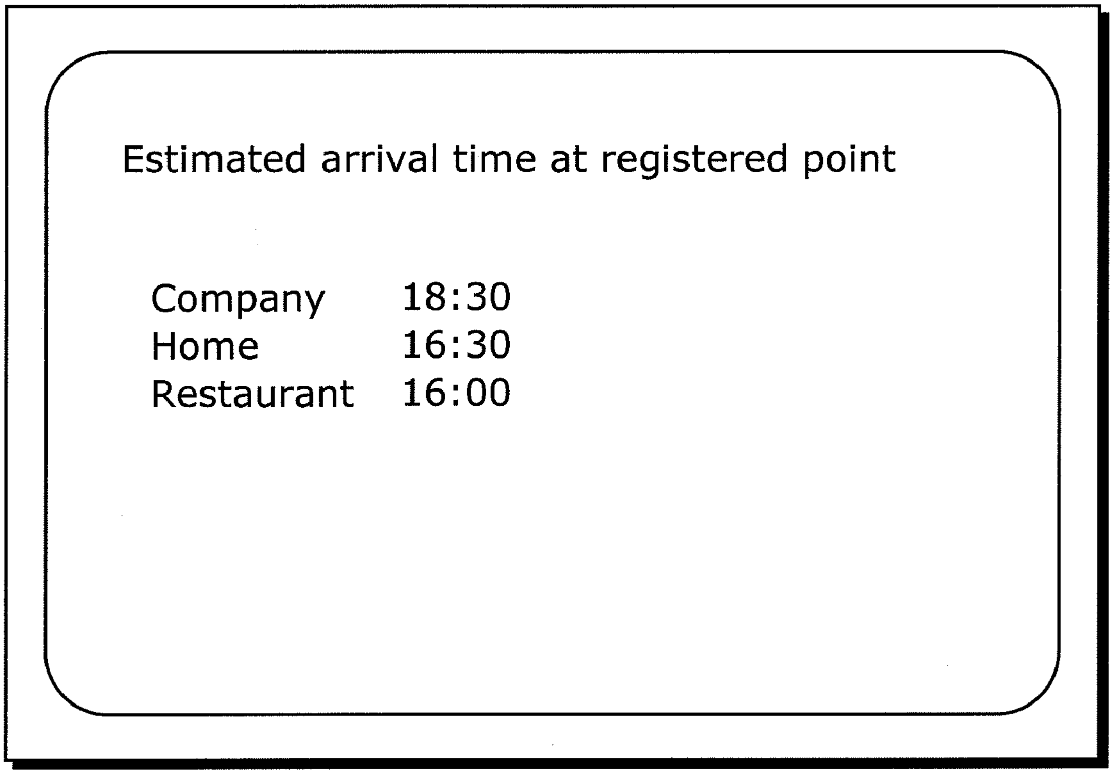
FIG. 37 is a diagram showing a screenshot according to the third embodiment.

Note that, in the present embodiment, the destination is predicted using the past driving time and the required time for arriving at the point where the stay characteristic is accumulated. As the driver estimates the required time for arriving at the destination using the past driving time, the required time for arriving at the destination is calculated without using updated traffic congestion information and the like. However, in the case where the required time for arriving at the destination is presented to the driver, a destination is predicted using the time and a stay characteristic. An estimated arrival time is presented to the driver, and the driver determines the destination, recognizing the time. It is predicted to head for a destination which is included in a stay time accumulated by a stay characteristic accumulating unit using the presented time. For example, as shown in FIG. 37, an estimated arrival time at a point to be a destination candidate is presented. As shown in FIG. 38, a point which is included in a stay period shown by a stay characteristic is predicated as the destination using the presented time. In this example, as it is presented that arrival at an office is 18:00 and a stay end time at the office is usually 17:00, it is judged that the driver would not head for the office. On the other hand, as it is presented that arrival at a home is 16:30 and it is judged that the driver would not head for the office, a destination is judged to be the home even though a stay start time at the home is 19:00.

INDUSTRIAL APPLICABILITY

A destination prediction apparatus according to the present invention allows a destination to be predicted using position information obtained from an in-vehicle terminal, a mobile terminal, and the like. For instance, it can be applied to an in-vehicle device and the like, such as a car navigation.

The invention claimed is:

1. A destination prediction apparatus which predicts a destination of a mobile object, said destination prediction apparatus comprising:

a travel history accumulating unit in which travel history information regarding a past travel of the mobile object is accumulated;

a stay characteristic extracting unit operable to extract, from the travel history information, information indicating a previous time period when the mobile object has stayed at a predetermined point;

a stay characteristic accumulating unit operable to accumulate, in advance, the extracted information as stay characteristic information indicating a time period when the mobile object will likely stay at the point without associating the extracted information with a departure point of the past travel to the point; and a destination predicting unit operable to (i) calculate an estimated arrival time in a case where the mobile object departs from a current location to the point, the estimated arrival time being calculated independently of the stay characteristic information accumulated in said stay characteristic unit, and (ii) to predict the point as the destination only when a condition that the calculated estimated arrival time and the time period indicated by the stay characteristic information are temporally close is satisfied, wherein said stay characteristic extracting unit is operable to extract, from the travel history information, pieces of information, each of which indicating a previous time period when the mobile object has stayed at one of a plurality of points, said stay characteristic accumulating unit is operable to accumulate the extracted pieces of information as stay characteristic information for each of the plurality of points, and said destination predicting unit is operable, in a case where there are at least two of the plurality of points in which an estimated arrival time for the at least two plurality of points falls between a stay start time and a stay end time indicated by the stay characteristic information for the at least two plurality of points, to preferentially predict, as the destination of the mobile object, a point from among the at least two of the plurality of points where a difference between the estimated arrival time and the stay end time for the point among the at least two of the plurality of points is greater than a difference between the estimated arrival time and the stay end time of another point from among the at least two of the plurality of points.

2. The destination prediction apparatus according to claim 1, wherein the stay characteristic information indicates a stay start time which is a time when the mobile object will likely start staying at the point, and a stay end time which is a time when the mobile object will likely end staying at the point, and said destination predicting unit is operable to predict the point as the destination only when the calculated estimated arrival time falls between the stay start time and the stay end time both indicated by the stay characteristic information.

3. The destination prediction apparatus according to claim 2, wherein said destination predicting unit is further operable to predict the point as the destination, even when the estimated arrival time does not fall between the stay start time and the stay end time, in a case where a difference between the estimated arrival time and the stay start time is equal to or smaller than a predetermined threshold.

4. The destination prediction apparatus according to claim 2, wherein a business start time and a business end time at a facility located at the point is accumulated, as the stay start time and the stay end time, in said stay characteristic accumulating unit.

5. The destination prediction apparatus according to claim 4, wherein said destination predicting unit is operable to predict the point as the destination only when a difference between the estimated arrival time and the stay end time is equal to or greater than a predetermined threshold.

6. The destination prediction apparatus according to claim 4, wherein information regarding a facility category for the facility is accumulated in said stay characteristic accumulating unit, and said destination predicting unit is operable to predict the point as the destination only when a difference between the estimated arrival time and the stay end time is equal to or greater than a predetermined threshold defined depending on the facility category.

7. The destination prediction apparatus according to claim 4, further comprising a facility information displaying unit operable to search business hours of one or more facilities accumulated in said stay characteristic accumulating unit, and to display information regarding the searched business hours of the one or more facilities, wherein said destination predicting unit is operable to predict the destination from the one or more facilities having the information displayed by said facility information displaying unit.

8. The destination prediction apparatus according to claim 1, wherein, in a case where travel history information regarding the current location is accumulated, said destination prediction apparatus predicts the destination using the travel history information.

9. The destination prediction apparatus according to claim 1, wherein said destination predicting unit is operable, by causing a Central Processing Unit to execute a prestored program, to: readout, to a working memory, the stay characteristic information from said stay characteristic accumulating unit; perform prediction by referring to the stay characteristic information read out to the working memory; and output, to a display device, information indicating a result of the prediction.

* * * * *